(12) United States Patent
Numakami et al.

(10) Patent No.: US 10,917,446 B2
(45) Date of Patent: Feb. 9, 2021

(54) COMMUNICATION APPARATUS, COMMUNICATION METHOD, AND STORAGE MEDIUM

(71) Applicant: CANON KABUSHIKI KAISHA, Tokyo (JP)

(72) Inventors: Yukio Numakami, Kawasaki (JP); Kensuke Yasuma, Tokyo (JP); Makoto Kunimatsu, Tokyo (JP); Tomoya Sakai, Kawasaki (JP); Kazuya Taniguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 15/574,434

(22) PCT Filed: Mar. 30, 2016

(86) PCT No.: PCT/JP2016/001843
§ 371 (c)(1),
(2) Date: Nov. 15, 2017

(87) PCT Pub. No.: WO2016/185654
PCT Pub. Date: Nov. 24, 2016

(65) Prior Publication Data
US 2018/0139255 A1   May 17, 2018

(30) Foreign Application Priority Data

May 20, 2015   (JP) ................................ 2015-102822

(51) Int. Cl.
*H04L 29/06* (2006.01)
*H04L 12/825* (2013.01)
(Continued)

(52) U.S. Cl.
CPC ............ *H04L 65/4069* (2013.01); *G06F 8/65* (2013.01); *H04L 47/26* (2013.01); *H04L 67/02* (2013.01); *H04L 67/42* (2013.01)

(58) Field of Classification Search
CPC ..... H04L 65/4069; H04L 47/26; H04L 67/02; H04L 67/42; G06F 8/65
(Continued)

(56) References Cited

U.S. PATENT DOCUMENTS 6,594,701 B1   7/2003   Forin
6,785,707 B2   8/2004   Teeple
(Continued)

FOREIGN PATENT DOCUMENTS

CN   101540769 A   9/2009
CN   103685229 A   3/2014
(Continued)

OTHER PUBLICATIONS

M. Belshe, "Hypertext Transfer Protocol Version 2 (HTTP/2), RFC 7540", Google, Inc, pp. 47-48, 65-66, and others (Year: 2015).*
(Continued)

*Primary Examiner* — Joseph L Greene
(74) *Attorney, Agent, or Firm* — Canon U.S.A., Inc. IP Division

(57) ABSTRACT

A communication apparatus receiving data included in a content from a transmitting apparatus by using a logical connection with the transmitting apparatus includes a notifying unit configured to notify the transmitting apparatus of information regarding an amount of data that the communication apparatus permits transmission of data using the logical connection from the transmitting apparatus to the communication apparatus, a receiving unit configured to receive data included in the content transmitted from the transmitting apparatus in response to the notification per-
(Continued)

formed by the notifying unit, and a control unit configured to control so as to inhibit the notification by the notifying unit until the logical connection is disconnected in a case where the amount of data not received by the receiving unit of the data included in the content is smaller than a predetermined value.

16 Claims, 9 Drawing Sheets

(51) Int. Cl.
*G06F 8/65* (2018.01)
*H04L 29/08* (2006.01)

(58) Field of Classification Search
USPC .......................................................... 709/219
See application file for complete search history.

(56) References Cited

U.S. PATENT DOCUMENTS 7,873,736 B1 * 1/2011 Sethi ................... G06F 21/6272
709/229

| 2003/0188106 | A1 | 10/2003 | Cohen | |
|---|---|---|---|---|
| 2011/0188834 | A1* | 8/2011 | Matsushima | ............ H04N 9/80 |
| | | | | 386/248 |
| 2015/0100622 | A1 | 4/2015 | Urban et al. | |

FOREIGN PATENT DOCUMENTS

| CN | 104040545 A | 9/2014 | |
|---|---|---|---|
| EP | 2048833 A1 * | 4/2009 | ............ H04L 47/10 |
| EP | 2048833 A1 | 4/2009 | |
| EP | 2104282 A1 | 9/2009 | |
| EP | 2417719 A1 | 2/2012 | |
| JP | 2001-203705 A | 7/2001 | |
| JP | 2009-71766 A | 4/2009 | |

OTHER PUBLICATIONS

Belshe et al., "Hypertext Transfer Protocol version 2 draft-ietf-httpbis-http2-16", HTTPbis Working Group, Nov. 29, 2014, pp. 19-20, [retrieved on Apr. 14, 2016), Retrieved from the Internet:<URL:https://tools.ietf.org/pdf/draft-ietf-httpbis-http2-16.pdf >.

* cited by examiner

[Fig. 1]
[Fig. 2]
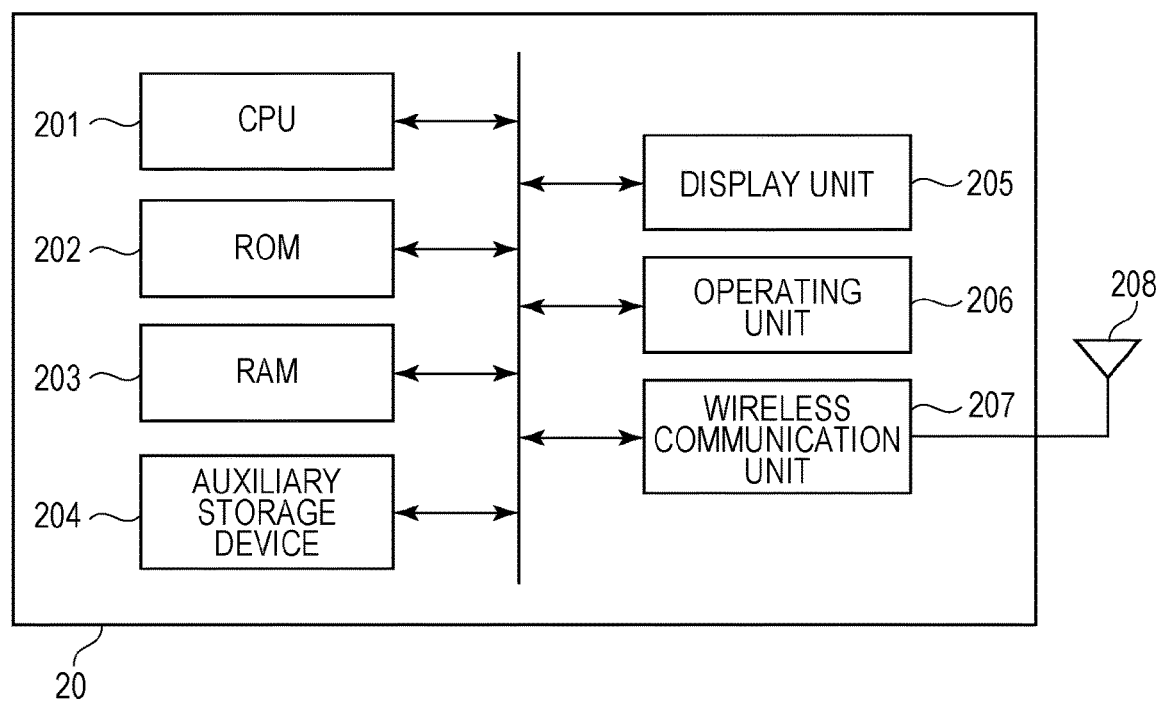

[Fig. 3]
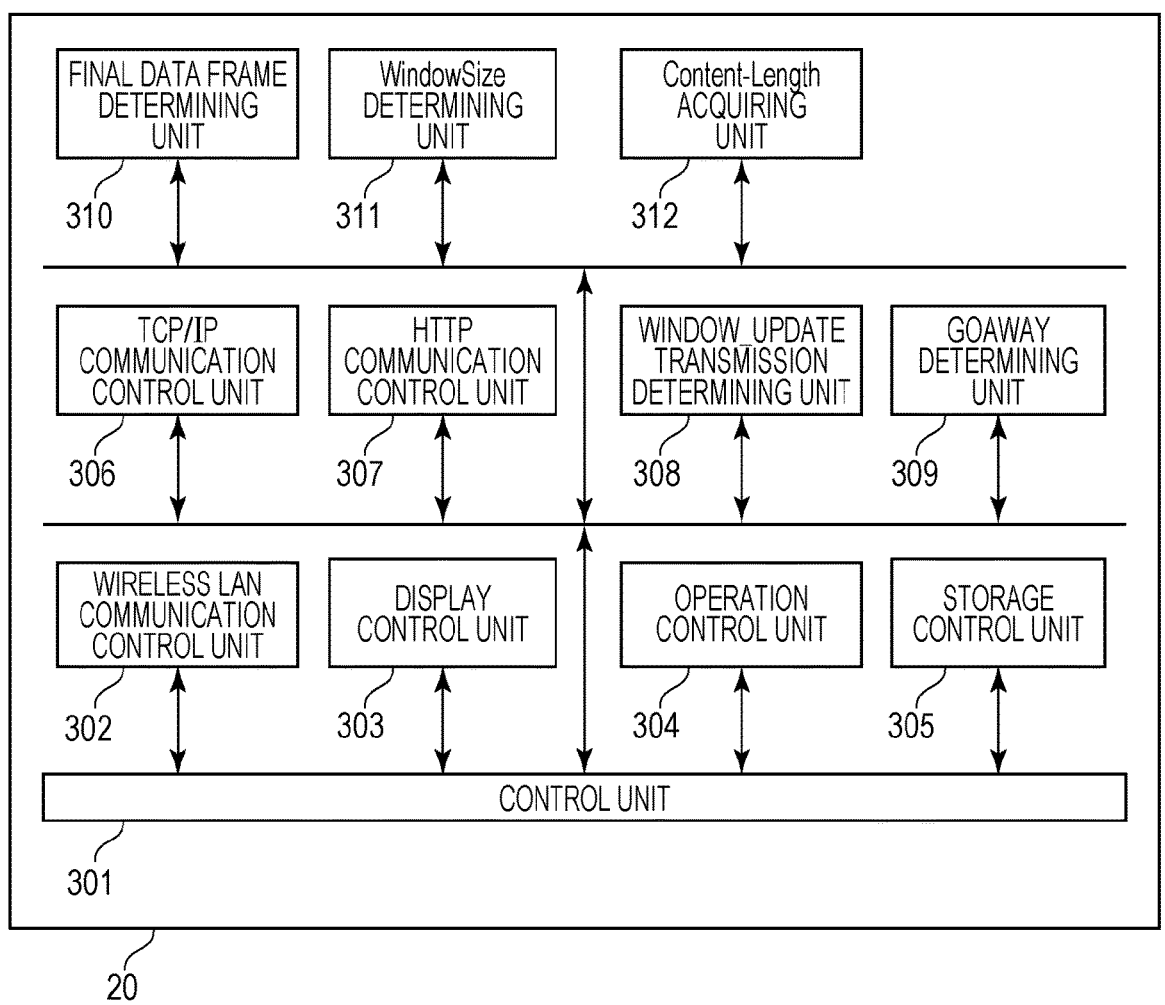

[Fig. 4]
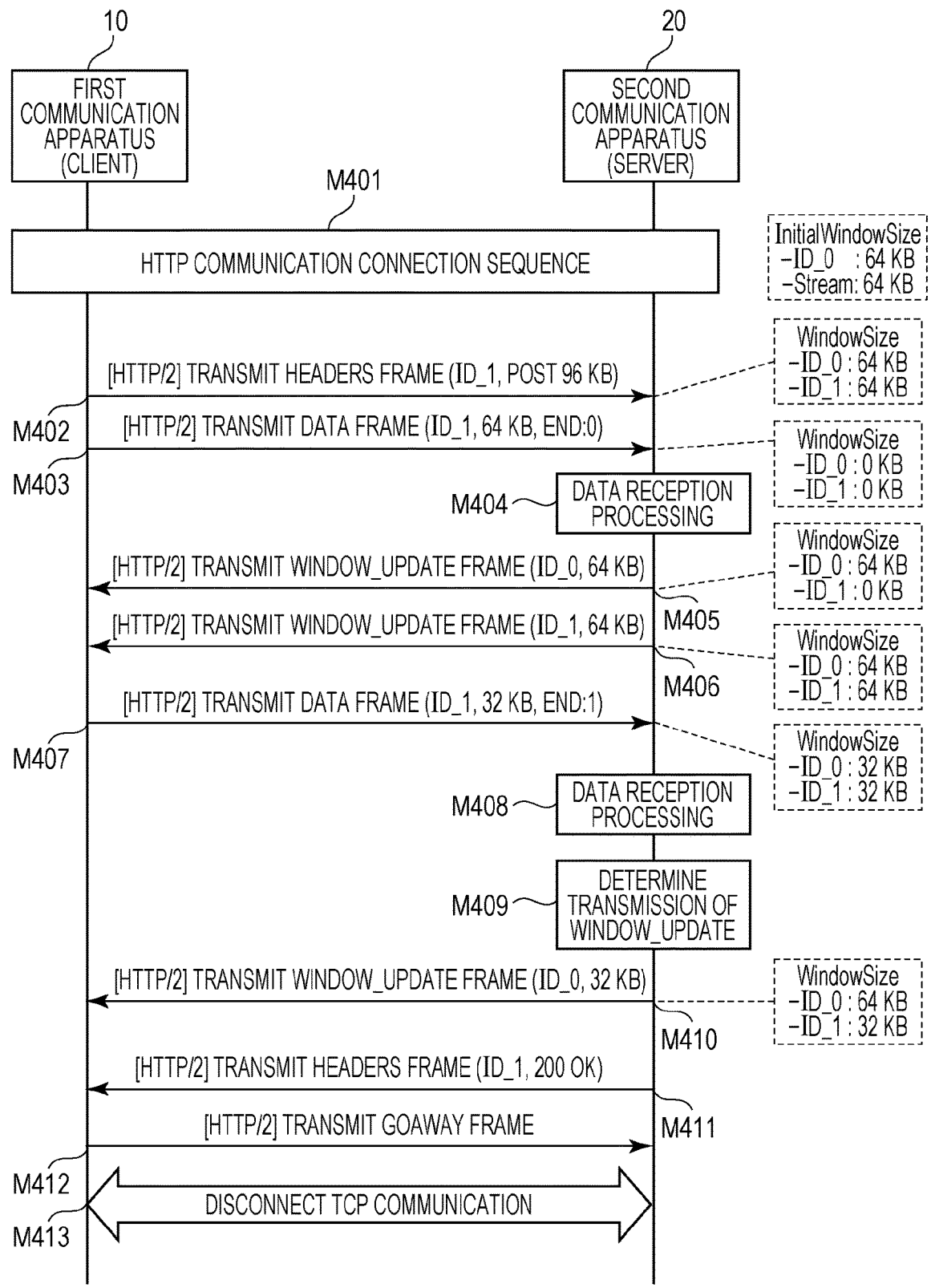

[Fig. 5]
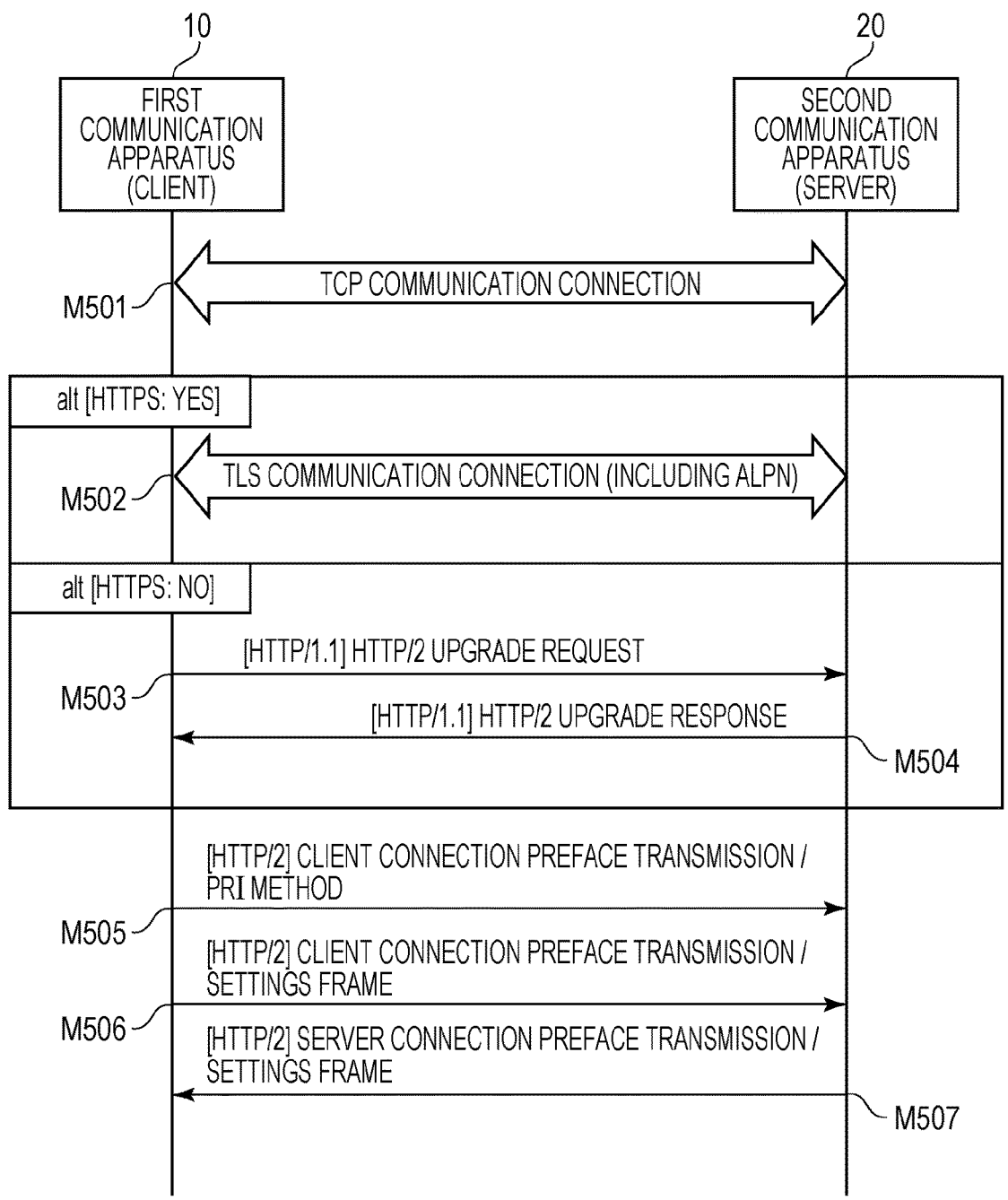

[Fig. 6]
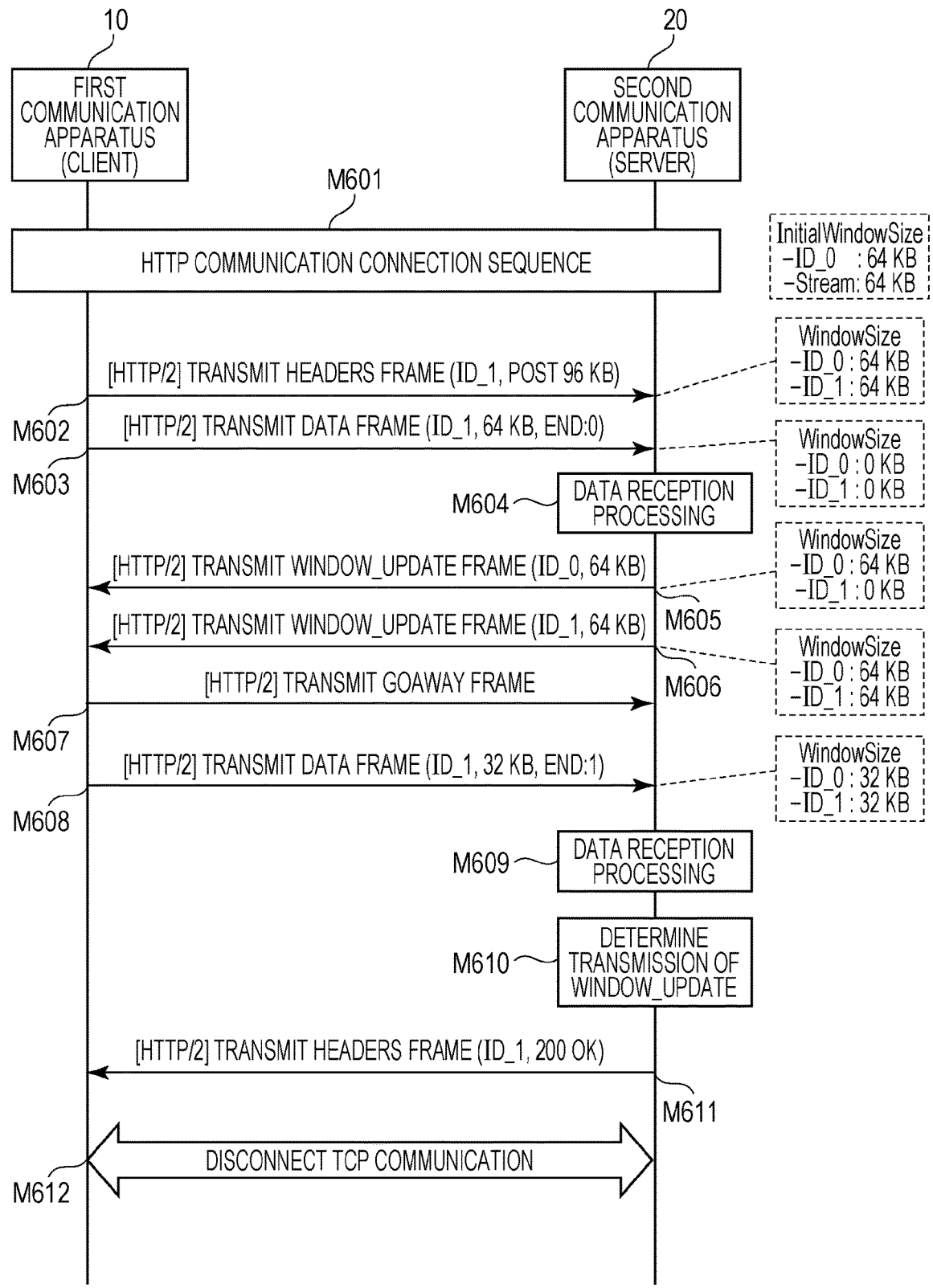

[Fig. 7]
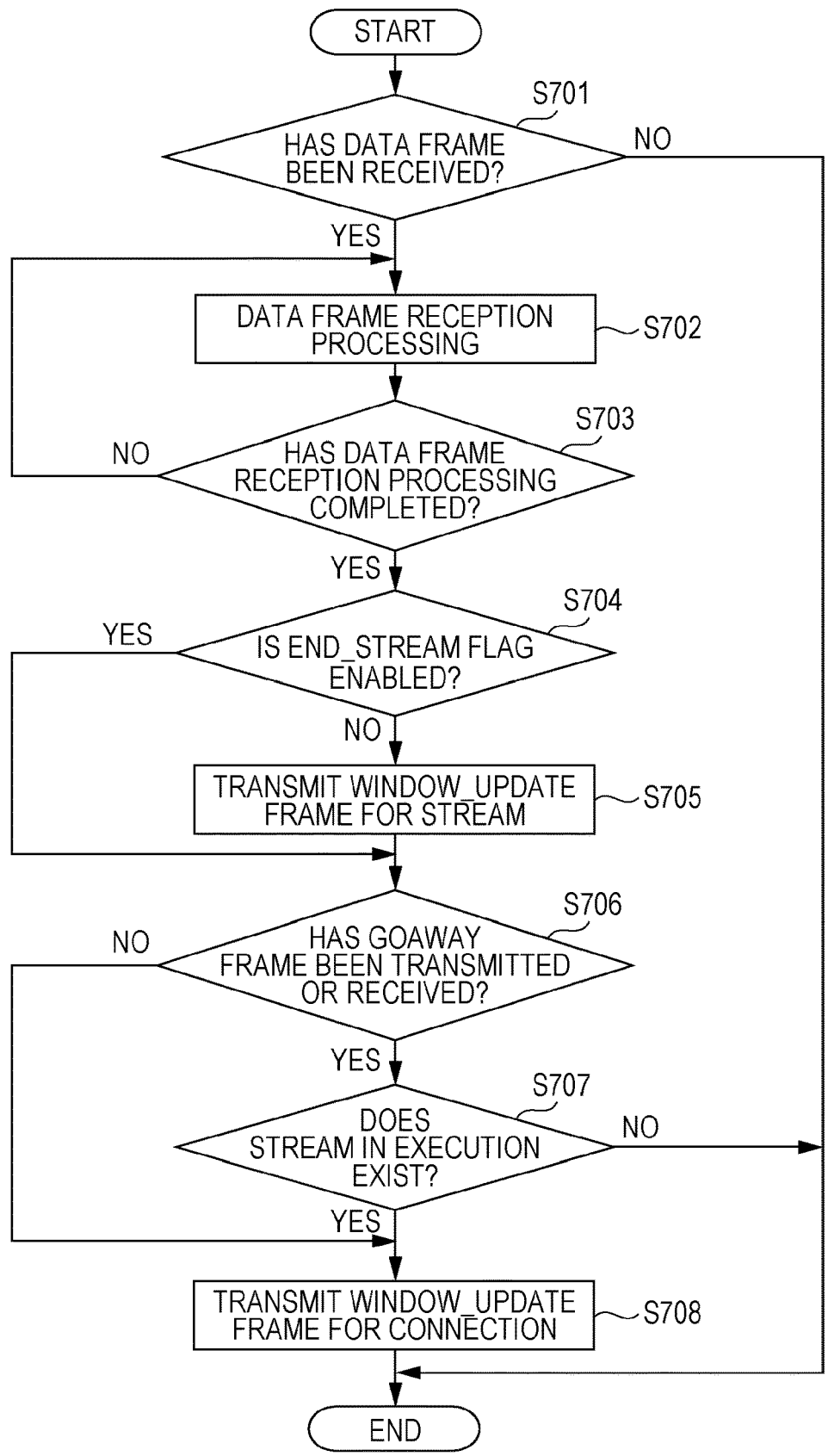

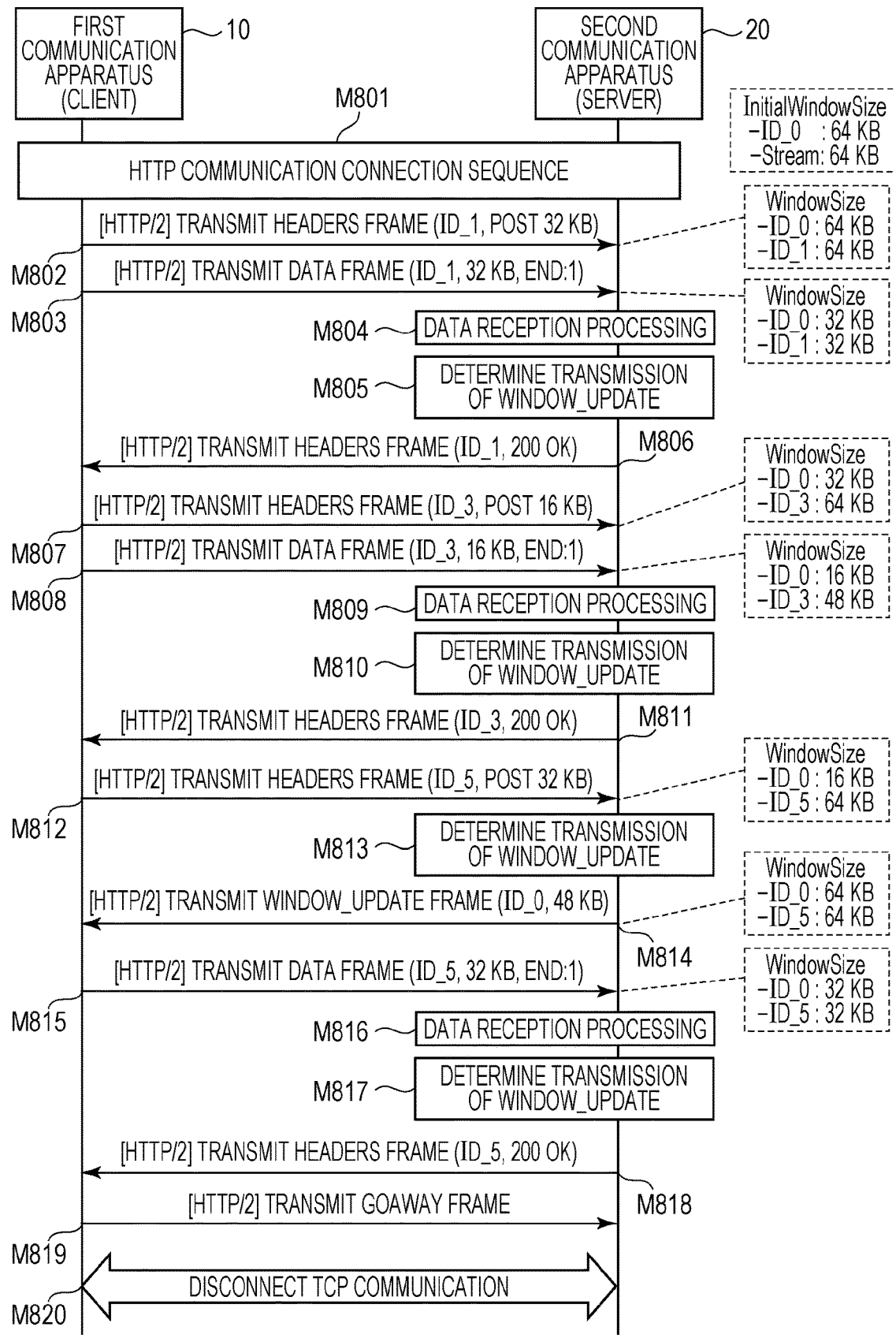
[Fig. 8]

[Fig. 9]
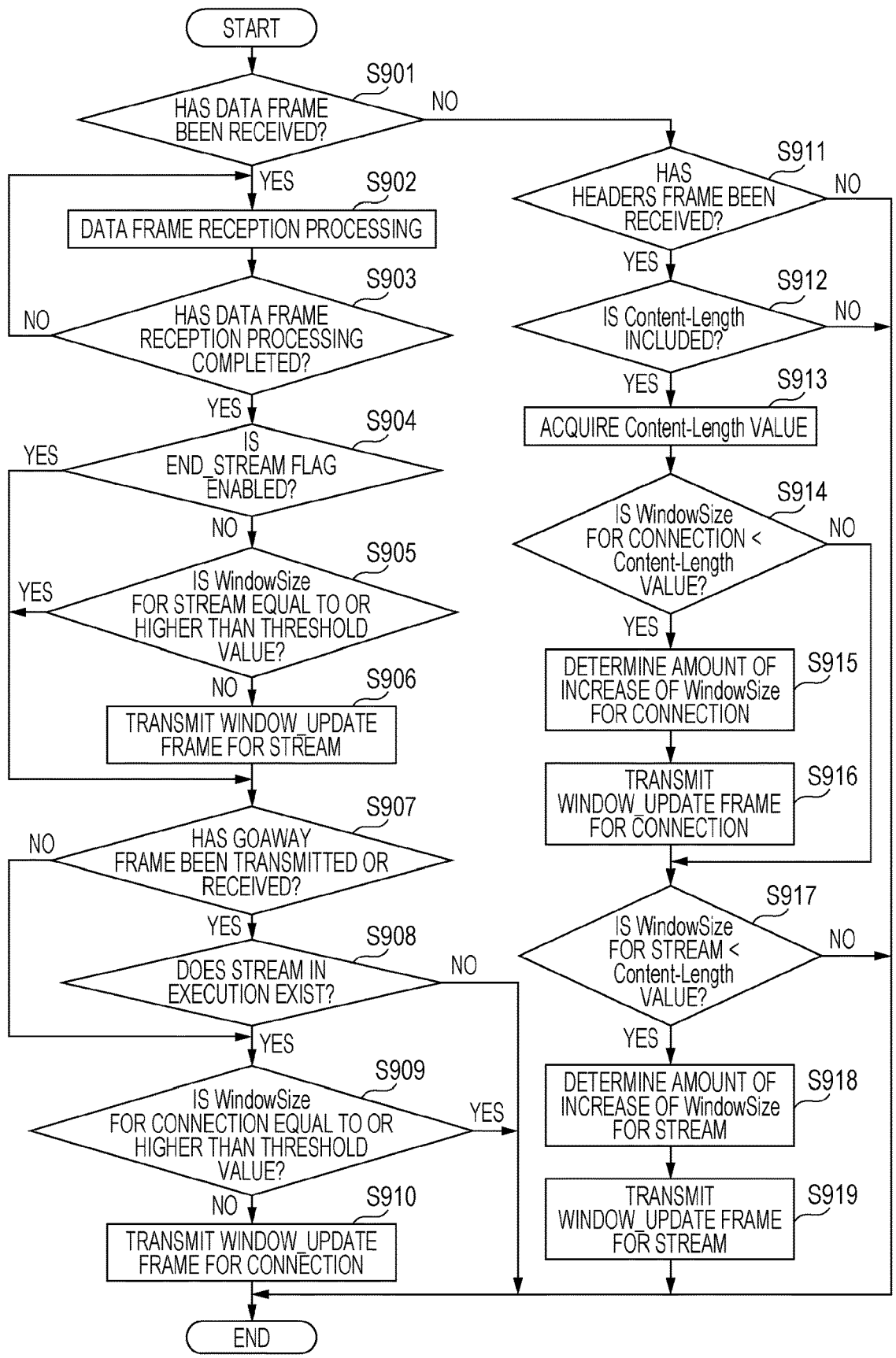

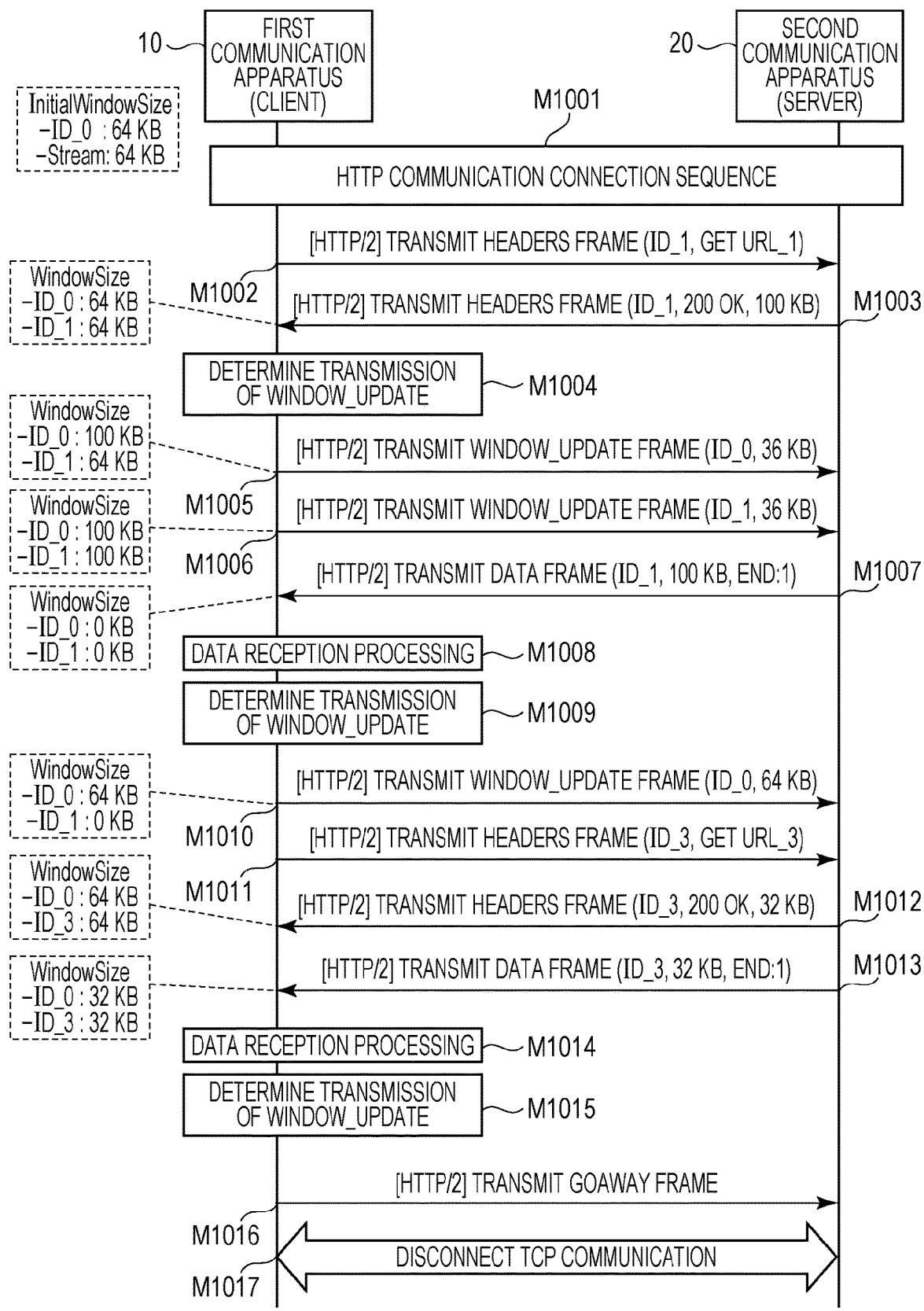
[Fig. 10]

COMMUNICATION APPARATUS, COMMUNICATION METHOD, AND STORAGE MEDIUM

TECHNICAL FIELD

The present invention relates to a communication method for communication using a logical connection.

BACKGROUND ART

HTTP (Hyper Text Transfer Protocol) is one of protocols (or communication protocols) in an application layer of an OSI reference model widely used as an Internet standard technology. As a new version of HTTP, the Internet standardization organization (IETF: Internet Engineering Task Force) has developed an HTTP/2 standard. HTTP/2 standard provides a mechanism for flow control using an HTTP message. The flow control is used to prevent a communication apparatus from failing to receive whole data whose amount exceeds the capacity of a reception buffer. In the past, the flow control is executed by a TCP (Transmission Control Protocol) function, which is a protocol in a transport layer (see PTL 1). On the other hand, flow control according to HTTP/2 controls transmission and reception of data by using a WINDOW_UPDATE frame which is one of control frames. A receiving communication apparatus controls a window size representing an amount of data storable in a reception buffer and transmits in a WINDOW_UPDATE frame an increased amount of the window size due to processing of data within the reception buffer to a transmitting communication apparatus. The transmitting communication apparatus is permitted to newly transmit the amount of data notified by the WINDOW_UPDATE frame to the receiving communication apparatus. Normally in an HTTP/2 communication, the reception of a WINDOW_UPDATE frame is performed every time the window size changes due to reception processing of a DATA frame performed by a communication apparatus.

However, there is a problem that frequent notifications of the amount of data that a receiving communication apparatus permits the transmitting communication apparatus to transmit may result in a high processing load in the receiving communication apparatus.

CITATION LIST

Patent Literature

PTL 1: Japanese Patent Laid-Open No. 2009-71766

SUMMARY OF INVENTION

The present invention provides a communication apparatus receiving data included in a content from a transmitting apparatus by using a logical connection with the transmitting apparatus, the communication apparatus including a notifying unit configured to notify the transmitting apparatus of information regarding an amount of data that the communication apparatus permits transmission of data using the logical connection from the transmitting apparatus to the communication apparatus, a receiving unit configured to receive data included in the content transmitted from the transmitting apparatus in response to the notification performed by the notifying unit, and a control unit configured to control so as to inhibit the notification by the notifying unit until the logical connection is disconnected in a case where the amount of data not received by the receiving unit of the data included in the content is smaller than a predetermined value.

Further features of the present invention will become apparent from the following description of exemplary embodiments with reference to the attached drawings.

BRIEF DESCRIPTION OF DRAWINGS

FIG. 1 illustrates a configuration example of a communication system according to an exemplary embodiment.

FIG. 2 is a block diagram illustrating a hardware configuration example of a second communication apparatus 20 according to an exemplary embodiment.

FIG. 3 is a block diagram illustrating a functional module configuration example of the second communication apparatus 20 according to an exemplary embodiment.

FIG. 4 is a sequence diagram for describing system operations to be performed in a case where the second communication apparatus 20 does not transmit a WINDOW_UPDATE frame for a stream in response to the last data reception in a stream according to a first exemplary embodiment.

FIG. 5 is a sequence diagram for describing operations regarding an HTTP communication connection between the second communication apparatus 20 and a first communication apparatus 10 according to an exemplary embodiment.

FIG. 6 is a sequence diagram for describing system operations to be performed in a case where the second communication apparatus 20 does not transmit a WINDOW_UPDATE frame for connection in response to the last data reception in a connection according to a first exemplary embodiment.

FIG. 7 is a flowchart for describing operations relating to determination of transmission of a WINDOW_UPDATE frame by the second communication apparatus 20 according to the first exemplary embodiment.

FIG. 8 is a sequence diagram for describing system operations to be performed in a case where the second communication apparatus 20 determines transmission of a WINDOW_UPDATE frame based on Content-Length and WindowSize according to a second exemplary embodiment.

FIG. 9 is a flowchart for describing operations relating to determination of transmission of a WINDOW_UPDATE frame by the second communication apparatus 20 according to the second exemplary embodiment.

FIG. 10 is a sequence diagram for describing system operations to be performed in a case where the first communication apparatus 10 determines the amount of data to be notified in a WINDOW_UPDATE frame based on Content-Length according to a third exemplary embodiment.

DESCRIPTION OF EMBODIMENTS

Exemplary embodiments of the present invention will be described below with reference to drawings. It should be understood that the following exemplary embodiments are not intended to limit the claimed invention and that all of combinations of characteristics according to the following exemplary embodiments are not required in the present invention.

First Embodiment

System Configuration

FIG. 1 illustrates a configuration example of a communication system. The communication system includes a first communication apparatus 10 (hereinafter, called a communication apparatus 10) and a second communication apparatus 20 (hereinafter, called a communication apparatus 20) which are connected over a wireless LAN (Local Area Network) based on IEEE 802.11.

The communication apparatus 10 is a communication apparatus serving as a client and uses a logical connection (such as a connection and a stream, which will be described below) with the communication apparatus 20 to transmit or receive data included in a content (such as text, an image, and a moving image). The communication apparatus 20 is a communication apparatus serving as a server and uses a logical connection with the communication apparatus 10 to transmit or receive data included in a content. Specific examples of the communication apparatus 10 and communication apparatus 20 may include a digital camera, a digital camcorder, a network camera, a printer, a digital multi-function peripheral, a digital television, a projector, a cellular phone, a smart phone, a PC, and a server apparatus. In accordance with details of a communication, one of the communication apparatus 10 and the communication apparatus 20 functions as a data transmitting apparatus while the other functions as a data receiving apparatus.

For example, in a case where the communication apparatus 10 is a printer and the communication apparatus 20 is a server apparatus, a user may operate a control panel of the printer to select an image to be printed from images stored in the server apparatus. When an image is selected, the printer requests the server apparatus to transmit data of the image and receives and prints the image data by using the logical connection. In this case, the communication apparatus 20 being a server apparatus functions as a data transmitting apparatus, and the communication apparatus 10 being a printer functions as a data receiving apparatus. For example, in a case where the communication apparatus 10 is a digital camera and the communication apparatus 20 is a server apparatus, a user may select an image to be uploaded to the server apparatus from images stored in the camera. When an image is selected, the digital camera transmits the image data to the server apparatus by using the logical connection. In this case, the communication apparatus 10 being a digital camera functions as a data transmitting apparatus, and the communication apparatus 20 being a server apparatus functions as a data receiving apparatus.

Describing that according to this exemplary embodiment, a wireless LAN connection is established directly between the communication apparatus 10 and the communication apparatus 20, aspects of the present invention are not limited thereto. The connection may be established via an external wireless access point. Aspects of the present invention are not limited to a wireless LAN communication function but may use a wireless communication function of Bluetooth (registered trademark), ZigBee (registered trademark), or RFID, for example. Alternatively, a wired LAN communication function such as Ethernet (registered trademark) or a combination of a wireless LAN communication function and a wired LAN communication function may be used. When a wired LAN connection is used, a connection may be established via a relay device such as a network switch and a router. According to this exemplary embodiment, the communication apparatus 10 and the communication apparatus 20 are connected over one LAN, but aspects of the present invention are not limited thereto. The connection may be established via a WAN (Wide Area Network), the Internet, or a public wireless line for cellular phones, for example.

Next, components of the communication apparatuses will be described in detail. FIG. 2 is a block diagram illustrating a hardware configuration example of the communication apparatus 20. It should be noted here that both of the communication apparatus 10 and the communication apparatus 20 have an identical configuration. According to this exemplary embodiment, the communication apparatus 10 uses a POST method to upload data to the communication apparatus 20. Therefore, the communication apparatus 20 who executes a flow control will be described mainly. The communication apparatus 20 includes a CPU 201, a ROM 202, a RAM 203, an auxiliary memory device 204, a display unit 205, an operating unit 206, a wireless communication unit 207, and an antenna 208.

The CPU 201 generally controls the communication apparatus 20. The ROM 202 stores a program and parameters which are not required to be changed. The RAM 203 temporarily stores a program and data to be supplied from the auxiliary memory device 204, for example. The auxiliary memory device 204 stores data of an image content and a moving picture content. The display unit 205 displays a GUI (Graphical User Interface) usable by a user for operating the communication apparatus 20. The operating unit 206 is an input interface usable by a user for operating the communication apparatus 20. The wireless communication unit 207 controls the antenna 208 to establish a wireless LAN communication with the communication apparatus 10. When the communication apparatus 10 and the communication apparatus 20 are connected via an external wireless access point (not illustrated), the wireless communication unit 207 controls the antenna 208 to establish a wireless LAN communication with the wireless access point. Though the display unit 205 and the operating unit 206 are provided within the communication apparatus 20 according to this exemplary embodiment, at least one of the display unit 205 and the operating unit 206 may be provided as a separate device to the communication apparatus 20.

Functional Module Configuration

FIG. 3 is a block diagram illustrating a functional module configuration example of the communication apparatus 20. It should be noted that the communication apparatus 10 and the communication apparatus 20 have an identical configuration. The communication apparatus 20 includes a control unit 301, a wireless LAN communication control unit 302 (hereinafter, called a wireless control unit 302), a display control unit 303, an operation control unit 304, a storage control unit 305, and a TCP/IP communication control unit 306 (hereinafter, a TCP control unit 306). The communication apparatus 20 further includes an HTTP communication control unit 307 (hereinafter, called an HTTP control unit 307), a WINDOW_UPDATE transmission determining unit 308 (hereinafter, called an UPDATE determining unit 308), and a GOAWAY determining unit 309. The communication apparatus 20 further includes a final DATA frame determining unit 310 (hereinafter, called a final determining unit 310), a WindowSize determining unit 311 (hereinafter, called a Size determining unit 311), and a Content-Length acquiring unit 312 (hereinafter Length acquiring unit 312). Each of these modules are implemented by processing performed based on flowcharts, which will be described below, described in corresponding programs stored in the ROM 202, decompressed into the RAM 203 and executed by the CPU 201. For example, when processing by hardware is performed as an alternative to software processing using the CPU 201, a computing unit and a circuit corresponding to the processing of the modules as described above may be provided. It should be understood that the communication apparatus 20 does not necessarily require all of the modules.

The control unit 301 controls the functional modules included in the communication apparatus 20. The wireless control unit 302 controls the wireless communication unit 207 so as to control wireless LAN communication with the communication apparatus 10. When the communication apparatus 10 and the communication apparatus 20 are connected via an external wireless access point, the wireless control unit 302 controls the wireless communication unit 207 so as to control wireless LAN communication with a wireless access point (not illustrated). The display control unit 303 controls the display unit 205 for display control of GUIs in the communication apparatus 20. The operation control unit 304 controls the operating unit 206 so as to control an operation input from a user to the communication apparatus 20. The storage control unit 305 controls the RAM 203 and the auxiliary memory device 204 so as to storage or deletion of data of processing data, an image content, or a moving picture content, for example.

The TCP control unit 306 uses the wireless control unit 302 for communication control based on TCP/IP (Internet Protocol) with the communication apparatus 10. According to this exemplary embodiment, TCP/IP communication is applied. However, an aspects of the present invention is not limited thereto, but communication based on other protocols such as UDP (User Datagram Protocol) may be performed. The HTTP control unit 307 uses the TCP control unit 306 for communication control based on HTTP/2 with the communication apparatus 10. The HTTP control unit 307 also supports communication control based on HTTPS (HTTP Security) applying TLS (Transport Layer Security) with the communication apparatus 10. However, the HTTP control unit 307 may perform communication control based on other schemes (such as SPDY).

A communication apparatus supporting HTTP/2 communication establishes a connection (logical first connection) in a transport layer of an OSI reference model with a communication apparatus. Such a communication apparatus can further establish a plurality of streams (logical second connections) based on the connection for communications in an independent sequence in each of the streams. The stream establishment is implemented by transmitting a HEADERS frame designating an ID of a stream to be established from a communication apparatus to the other communication apparatus by using a connection on which the stream is based. The message to be transmitted using the connection has a set stream ID by which the stream to be used in the connection for transmitting the message can be identified. A message having a form called a frame is to be exchanged between communication apparatuses based on HTTP/2. Concrete examples of the frame may include a HEADERS frame and WINDOW_UPDATE frame including control information and DATA frame including a part or all of data (payload data) included in a content. The communication apparatus 20 may use a logical connection excluding a connection and a stream for communication based on a protocol excluding HTTP/2, for example.

The UPDATE determining unit 308 determines whether a connection WINDOW_UPDATE frame and a stream WINDOW_UPDATE frame are to be transmitted or not. This determination may use at least one of the GOAWAY determining unit 309, the final determining unit 310, the Size determining unit 311, and the Length acquiring unit 312.

If transmission of a WINDOW_UPDATE frame is determined, the UPDATE determining unit 308 uses the HTTP control unit 307 to transmit the WINDOW_UPDATE frame to the communication apparatus 10. The communication apparatus 20 uses a stream WINDOW_UPDATE frame to notify the communication apparatus 10 of information (first information) regarding the amount of data that the communication apparatus 20 permits the transmission of data using a stream from the communication apparatus 10 to the communication apparatus 20. A connection WINDOW_UPDATE frame may be used to notify information (second information) regarding the amount of data that the communication apparatus 20 permits transmission of data using one or more streams based on a connection from the communication apparatus 10 to the communication apparatus 20. The communication apparatus 10 in response to the notification transmits to the communication apparatus 20 payload data regarding an amount whose higher limit is equal to a value based on a parameter regarding the amount of data described in the WINDOW_UPDATE frame. For communication based on a protocol excluding HTTP/2, for example, the communication apparatus 20 may notify information regarding the amount of data in a message excluding a WINDOW_UPDATE frame.

The communication apparatus 20 uses a WINDOW_UPDATE frame which is one of control frames as described above for flow control including management of data transmission from the communication apparatus 10 to connections and streams. More specifically, the communication apparatus 20 manages WindowSizes (window sizes) defined as free spaces of reception buffers corresponding to connections and streams. When data reception using a stream results in reduction of a free space in the reception buffer, the communication apparatus 20 reduces the WindowSize corresponding to the stream and the WindowSize corresponding to the connection on which the stream based. The communication apparatus 20 notifies an amount of increase of the free space in the reception buffer due to the data reception processing to the communication apparatus 10 by transmitting a WINDOW_UPDATE frame to increase the WindowSize. The reception processing according to this exemplary embodiment refers to removal from the reception buffer of data received from the communication apparatus 10 by the communication apparatus 20 and stored in the reception buffer within the RAM 203 after processed by the CPU 201.

In other words, the WindowSize relating to the stream having a stream ID of 1 is an amount of data that the communication apparatus 20 has permitted the communication apparatus 10 to transmit data using the stream having an ID of 1. A connection WindowSize is an amount of data that the communication apparatus 20 has permitted the communication apparatus 10 to transmit data using one or more streams based on a connection. The communication apparatus 10 transmits payload data having an amount lower than the stream WindowSize and the connection WindowSize to the communication apparatus 20 by using a stream. However, for example, in some resource states of the communication apparatus 20 and some states of a communication path, the amount of data that the communication apparatus 20 has permitted transmission of data using a logical connection from the communication apparatus 10 to the communication apparatus 20 and the free space of the reception buffer may differ.

The GOAWAY determining unit 309 determines whether the HTTP control unit 307 has received a GOAWAY frame from the communication apparatus 10 or not, and whether a GOAWAY frame has been transmitted to the communication apparatus 10. A GOAWAY frame provided in HTTP/2 is information describing that a communication apparatus will not establish a new stream based on a connection used for the transmission of the GOAWAY frame. The communication apparatus 10 and the communication apparatus 20 may notify that a new stream will not be established by using a message excluding a GOAWAY frame when communication is implemented based on a protocol excluding HTTP/2, for example.

The final determining unit 310 determines whether the DATA frame received by the HTTP control unit 307 from the communication apparatus 10 by using a stream is a final DATA frame in the stream or not. The final determining unit 310 determines that the DATA frame is the final DATA frame in the stream if an END_STREAM flag in the frame header of the DATA frame is enabled (value of 1). According to this exemplary embodiment, the final DATA frame in a stream is the last DATA frame to be transmitted by using the stream from the communication apparatus 10 to the communication apparatus 20. The communication apparatus 20 may determine which frame is the final DATA frame based on information excluding the END_STREAM flag, such as information described in the HEADERS frame, for example.

The Size determining unit 311 determines the amounts of increase of the connection and stream WindowSizes described in the connection and stream WINDOW_UPDATE frames. How the amount of increase is to be determined will be described below.

If the HTTP control unit 307 receives the HEADERS frame, the Length acquiring unit 312 determines whether a Content-Length field is set in a header block fragment in the HEADERS frame or not. If so, the Length acquiring unit 312 obtains a Content-Length value from the HEADERS frame. The Content-Length represents an amount of data (the size of payload data) of a content to be transmitted subsequently to the HEADERS frame in which the Content-Length is set. The communication apparatus 20 determines the amount of data of a content based on information excluding the Content-Length in a case where the size of data requested to the communication apparatus 10 is known in advance, for example.

Communication Sequence (1)

A communication sequence between the communication apparatus 10 and the communication apparatus 20 according to this exemplary embodiment will be described in detail below. FIG. 4 is a sequence diagram for describing system operations in a case where the communication apparatus 20 does not transmit a stream WINDOW_UPDATE frame in response to the last data reception in the stream according to this exemplary embodiment. Referring to FIG. 4, the processing starts at a time point when a user operation for performing communication with the communication apparatus 20 is input to the communication apparatus 10, for example. However, the time for starting processing in FIG. 4 is not limited to the time point.

In M401, the communication apparatus 10 establishes a connection with the communication apparatus 20 for implementing HTTP communication connection. The detail sequence of the communication connection will be described below with reference to FIG. 5. This exemplary embodiment assumes that InitialWindowSize relating to the connection with the communication apparatus 20 is 64 KB which is a default value and InitialWindowSize relating to streams to be established subsequently is also 64 KB which is a default value. Referring to FIG. 4, "ID_0" indicates information relating to a connection.

In M402, the communication apparatus 10 transmits a HEADERS frame describing HTTP request header information to the communication apparatus 20. In this sequence, it is assumed that the HTTP request applies POST method, and that the communication apparatus 10 transmits 96 KB payload data to the communication apparatus 20. In response to the transmission of the HEADERS frame, the communication apparatus 20 establishes a new stream having a stream ID of 1. In this case, the WindowSize relating to the connection (ID_0) of the communication apparatus 20 is 64 KB, and the WindowSize relating to a stream 1 (ID_1) is 64 KB. This indicates that the communication apparatus 10 is permitted to transmit a DATA frame of up to 64 KB. According to this exemplary embodiment, a request from the communication apparatus 10 to the communication apparatus 20 uses a HEADERS frame designating POST method as described above. Without limiting thereto, other HTTP request method such as GET method and PUT method and other frames such as CONTINUATION may be used instead.

In M403, the communication apparatus 10 transmits DATA frame including data of 64 KB of the whole 96 KB payload data to the communication apparatus 20 by using the stream 1 (ID_1). Because the DATA frame is not the final DATA frame in the stream 1, the END_STREAM flag is disabled (having a value of 0). When the DATA frame is received by the communication apparatus 20, the WindowSize relating to the connection (ID_0) of the communication apparatus 20 is 0 KB, and the WindowSize relating to the stream 1 (ID_1) is 0 KB. This is because the communication apparatus 20 consumes the reception buffer due to the reception of the 64 KB DATA frame from the communication apparatus 10.

In M404, the communication apparatus 20 performs processing for receiving the DATA frame received in M403. In M405, the communication apparatus 20 transmits a WINDOW_UPDATE frame of 64 KB relating to the connection (ID_0) to the communication apparatus 10. As a result of the transmission of the WINDOW_UPDATE frame, the WindowSize relating to the connection (ID_0) of the communication apparatus 20 is equal to 64 KB while the WindowSize relating to the stream 1 (ID_1) is still equal to 0 KB. In M406, the communication apparatus 20 transmits a WINDOW_UPDATE frame of 64 KB relating to the stream 1 (ID_1) to the communication apparatus 10. As a result of the transmission of the WINDOW_UPDATE frame, the WindowSize relating to the stream 1 (ID_1) is also equal to 64 KB.

In M407, the communication apparatus 10 transmits data transmission in response to the notifications of the amounts of data that the communication apparatus 20 permits transmission with a WINDOW_UPDATE frame transmitted from the communication apparatus 20 in M405 and M406. Then, the HTTP control unit 307 in the communication apparatus 20 receives the data. More specifically, the communication apparatus 10 transmits a DATA frame including 32 KB of the rest of the entire 96 KB payload data to the communication apparatus 20 by using the stream 1 (ID_1). Because this is the final DATA frame in the stream 1, the END_STREAM flag is enabled (with a value of 1). When the communication apparatus 20 receives the DATA frame, the WindowSize relating to the connection (ID_0) of the communication apparatus 20 is equal to 32 KB, and the WindowSize relating to the stream 1 (ID_1) is equal to 32 KB.

In M408, the communication apparatus 20 performs processing for receiving the DATA frame received in M407. In M409, whether the communication apparatus 20 transmits a WINDOW_UPDATE frame or not is determined. In a case where information indicating data configuring the last content to be transmitted by using a logical connection is set in the data configuring the received content, the communication apparatus 20 controls so as not to execute the notification before the logical connection is disconnected. According to this exemplary embodiment, the DATA frame received by the communication apparatus 20 in M407 has the END_STREAM flag enabled. From this, the communication apparatus 20 determines that the DATA frame is the final DATA frame and that the stream 1 will not be used to receive DATA frames afterwards. Thus, the communication apparatus 20 determines that there is not a necessity for permitting transmission of data to the communication apparatus 10 by using the stream 1 and controls so as to prevent transmission of a WINDOW_UPDATE frame relating to the stream 1 until the stream 1 is disconnected.

In M410, the communication apparatus 20 transmits a WINDOW_UPDATE frame of 32 KB relating to the connection (ID_0) to the communication apparatus 10. When the WINDOW_UPDATE frame is transmitted, the Window-Size relating to the connection (ID_0) of the communication apparatus 20 is equal to 64 KB.

In M411, in response to the HTTP request received in M402 and the data received in M403 and M407, the communication apparatus 20 transmits an HEADERS frame, which is an HTTP response, to the communication apparatus 10. According to this exemplary embodiment, the HTTP response may have a status code "200 OK". The communication apparatus 20 transmits the HEADERS frame by using the stream 1. Having described that according to this exemplary embodiment, a HEADERS frame describing "200 OK" as described above, aspects of the present invention are not limited thereto. A HEADERS frame describing other status codes and other frames such as PUSH_PROMISE may be used instead. In M412, the communication apparatus 10 transmits a GOAWAY frame being information describing that a new stream will not be established from then to the communication apparatus 20 at the end of the connection. In M413, the communication apparatus 10 and the communication apparatus 20 terminate the HTTP communication connection. More specifically, the TCP connection is disconnected.

HTTP Communication Connection Sequence

FIG. 5 is a sequence diagram for describing operations relating to an HTTP communication connection between the communication apparatus 20 and the communication apparatus 10 and illustrating details of M401 in FIG. 4.

In M501, the communication apparatus 10 establishes a TCP connection with the communication apparatus 20. For an HTTPS communication, the communication apparatus 10 in M502 establishes a TLS (Transport Layer Security) communication connection with the communication apparatus 20. When the TLS communication connection is to be established, a negotiation for starting an HTTP/2 communication is also performed based on ALPN (Application Layer Protocol Negotiation). On the other hand, when an HTTPS communication is not to be established, the communication apparatus 10 in M503 transmits an HTTP/2 upgrade request to the communication apparatus 20. In M504, the communication apparatus 20 transmits an HTTP/2 upgrade response to the communication apparatus 10. After M502 or M504, an HTTP/2 communication is established between the communication apparatus 10 and the communication apparatus 20.

In M505, the communication apparatus 10 transmits a part designating a PRI method of a client connection preface to the communication apparatus 20. In M506, the communication apparatus 10 transmits a part corresponding to a SETTINGS frame of the client connection preface to the communication apparatus 20. In M507, the communication apparatus 20 transmits a server connection preface to the communication apparatus 10. The server connection preface may only include a SETTINGS frame which may possibly be empty.

Communication Sequence (2)

FIG. 6 is a sequence diagram for describing system operations in a case where the communication apparatus 20 does not transmit a connection WINDOW_UPDATE frame in response to the last data reception in the connection according to this exemplary embodiment. Referring to FIG. 6, the processing starts at a time point when a user operation for performing communication with the communication apparatus 20 is input to the communication apparatus 10, for example. However, the time for starting processing in FIG. 6 is not limited to the time point. Like numbers refer to like parts in FIG. 4 and FIG. 6, and the repetitive description will be omitted.

The same processing in M601 to M606 is the same as that in M401 to M406. In M607, the communication apparatus 10 transmits a GOAWAY frame being information describing that a new stream will not be established from then to the communication apparatus 20. The processing in M608 and M609 is the same as that in M407 and M408.

In M610, the communication apparatus 20 determines whether a WINDOW_UPDATE frame is to be transmitted or not. More specifically, the communication apparatus 20 determines whether the DATA frame received in M608 is the final DATA frame and the stream 1 will not be used to receive a DATA frame afterwards. Based on the reception of the GOAWAY frame in M607, the communication apparatus 20 determines that the DATA frame received in M608 is also the final DATA frame in the connection. In other words, the DATA frame is the last DATA frame to be transmitted from the communication apparatus 10 to the communication apparatus 20 by using the connection. Thus, the communication apparatus 20 determines that it does not have to permit the communication apparatus 10 to transmit data using the stream 1 from then and controls so as to inhibit transmission of a WINDOW_UPDATE frame relating to the stream 1 until the stream 1 is disconnected. The communication apparatus 20 determines that it does not have to permit the communication apparatus 10 to transmit data using the connection from then and controls so as to inhibit transmission of a WINDOW_UPDATE frame relating to the connection until the connection is disconnected. The processing in M611 and M612 is the same as that in M411 and M413.

Flow of Determination of Transmission of WINDOW_UPDATE Frame

FIG. 7 is a flowchart for describing operations relating to determination of transmission of a WINDOW_UPDATE frame to be performed by the communication apparatus 20 according to this exemplary embodiment. Referring to FIG. 7, the processing may start at a time point when the communication apparatus 20 receives some frame from the communication apparatus 10, for example. However, the time for starting processing in FIG. 7 is not limited to the time point.

In S701, the HTTP control unit 307 determines whether a stream with the communication apparatus 10 has been used to receive DATA frame that is data included in a content from the communication apparatus 10 or not. If a DATA frame has been received (S701, Yes), the processing moves to S702. If not (S701, No), the processing ends. In S702, the HTTP control unit 307 performs DATA frame reception processing. In S703, the HTTP control unit 307 determines whether the DATA frame reception processing has completed or not. If the DATA frame reception processing has completed (S703, Yes), the processing moves to S704. If not (S703, No), the processing returns to S702.

In S704, the UPDATE determining unit 308 determines whether a stream WINDOW_UPDATE frame is to be transmitted or not. If the data included in the received content has a setting of information indicating data included in the last content transmitted by using the logical connection, the UPDATE determining unit 308 controls so as to inhibit notifications until the logical connection is disconnected. According to this exemplary embodiment, the UPDATE determining unit 308 uses the final determining unit 310 to determine whether an END_STREAM flag in the frame header of the received DATA frame is enabled (having a value of 1) or not. If the END_STREAM flag is enabled (S704, Yes), the UPDATE determining unit 308 determines not to transmit the stream WINDOW_UPDATE frame, and the processing moves to S706. On the other hand, if the END_STREAM flag is not enabled (S704, No), the processing moves to S705.

In S705, the UPDATE determining unit 308 determines to transmit the WINDOW_UPDATE frame relating to the stream used for the DATA frame reception to the communication apparatus 10. The UPDATE determining unit 308 then uses the HTTP control unit 307 to transmit the stream WINDOW_UPDATE frame. Thus, information regarding the amount of data that the communication apparatus 20 permits data transmission using a stream from the communication apparatus 10 to the communication apparatus 20 is notified to the communication apparatus 10.

In S706, the UPDATE determining unit 308 determines whether the HTTP control unit 307 has received a GOAWAY frame from the communication apparatus 10 and whether a GOAWAY frame has been transmitted to the communication apparatus 10. The determinations use the GOAWAY determining unit 309. If the HTTP control unit 307 has not received or transmitted a GOAWAY frame (S706, No), the processing moves to S708. If it has received or transmitted a GOAWAY frame (S706, Yes), the processing moves to S707.

In S707, the UPDATE determining unit 308 uses the HTTP control unit 307 to determine whether any stream in execution exists or not. The expression "stream in execution" refers to a stream that is established between the communication apparatus 10 and the communication apparatus 20 and that is being used or will be used for reception of a DATA frame by the communication apparatus 20. If no stream in execution exist (S707, No), the UPDATE determining unit 308 determines not to transmit a connection WINDOW_UPDATE frame, and the processing ends. On the other hand, if a stream in execution exists (S707, Yes), the processing moves to S708.

In other words, in a case where a GOAWAY frame has been transmitted or received by the communication apparatus 20, where one stream based on the connection exists and where the last DATA frame in the stream has been received, the communication apparatus 20 executes following controls. In other words, the communication apparatus 20 controls so as to inhibit notification of second information regarding the amount of data that the communication apparatus 20 permits data transmission using the connection and notification of first information regarding the amount of data that the communication apparatus 20 permits data transmission using the stream. According to this exemplary embodiment, the GOAWAY frame is information describing that a new stream (second connection) based on a connection (first connection) will not be established. The notification of the second information is performed by transmission of a connection WINDOW_UPDATE frame, and notification of the first information is performed by transmission of a stream WINDOW_UPDATE frame.

In S708, the UPDATE determining unit 308 determines to transmit a WINDOW_UPDATE frame relating to the connection on which the stream used for the DATA frame reception based to the communication apparatus 10. The UPDATE determining unit 308 then uses the HTTP control unit 307 to transmit a connection WINDOW_UPDATE frame, and the processing ends. Thus, information regarding the amount of data that the communication apparatus 20 permits data transmission using the connection from the communication apparatus 10 to the communication apparatus 20 is notified to the communication apparatus 10.

As described above, if the final DATA frame in the stream is received, the communication apparatus 20 according to this exemplary embodiment controls so as not to transmit a WINDOW_UPDATE frame relating to the stream until the stream is disconnected. Normally, the communication apparatus 20 transmits two WINDOW_UPDATE frames for a connection and a stream for reception of one DATA frame. However, after reception of the final DATA frame in the stream, flow control relating to the stream is no longer necessary, and the transmission of the stream WINDOW_UPDATE frame is therefore not necessary. According to this exemplary embodiment, the transmission of unnecessary WINDOW_UPDATE frames from the communication apparatus 20 can be reduced, compared with a case where two WINDOW_UPDATE frames are transmitted every time a DATA frame is received. Therefore, the processing load can be reduced. The reduced processing load can also reduce battery consumption in a case where the communication apparatus 20 is operated with a battery, for example.

The communication apparatus 20 according to this exemplary embodiment determines whether the GOAWAY frame has been received or transmitted or not and whether any other stream in execution based on the connection exists or not if it receives the final DATA frame in the stream. A case will be discussed in which a GOAWAY frame has been received or transmitted by the communication apparatus 20 and no other stream in execution is established based on the connection. In this case, the communication apparatus 20 does not transmit the stream WINDOW_UPDATE frame and does not transmit the connection WINDOW_UPDATE frame either. The GOAWAY frame is information describing that a new stream will not be established based on the connection used for the transmission of the GOAWAY frame. Therefore, the final DATA frame in the stream received when a GOAWAY frame has been transmitted or received and one stream in execution exists corresponds to the final DATA frame in the connection. Therefore, the communication apparatus 20 does not have to transmit a connection WINDOW_UPDATE frame after that. Applying this exemplary embodiment, the communication apparatus 20 can further reduce the transmissions of unnecessary WINDOW_UPDATE frames and can therefore reduce the processing load.

On the other hand, a case will be discussed in which a GOAWAY frame has not been transmitted or received by the communication apparatus 20 and the communication apparatus 20 receives the final DATA frame in the stream from the communication apparatus 10. In this case, the communication apparatus 20 according to this exemplary embodiment controls so as not to transmit the stream WIN- DOW_UPDATE and to transmit the connection WINDOW_UPDATE. The communication apparatus 20 according to this exemplary embodiment transmits the connection WINDOW_UPDATE frame if there is another stream in execution even though the GOAWAY frame has been transmitted or received when the final DATA frame in the stream is received. As described above, the communication apparatus 20 according to this exemplary embodiment controls the transmission of the stream WINDOW_UPDATE and the transmission of the connection WINDOW_UPDATE based on different references. Thus, the communication apparatus 20 can avoid problems occurring in the flow control over streams in execution through reduction of transmissions of WINDOW_UPDATE frames.

Second Exemplary Embodiment

A second exemplary embodiment according to the present invention will be described below. A communication apparatus 20 according to the second exemplary embodiment determines whether a WINDOW_UPDATE frame is to be transmitted or not based on a Content-Length value and a WindowSize. The repetitive descriptions regarding communication system configurations, functional module configurations, sequences, and flowcharts according to the second exemplary embodiment that are identical to those of the first exemplary embodiment will be omitted.

According to this exemplary embodiment, if the HTTP control unit 307 receives a DATA frame, the UPDATE determining unit 308 determines whether a WINDOW_UPDATE frame is to be transmitted or not by using the final determining unit 310 and the Size determining unit 311. If the final determining unit 310 determines that the END_STREAM flag of the received DATA frame is enabled, the UPDATE determining unit 308 determines not to transmit a stream WINDOW_UPDATE frame. The Size determining unit 311 determines whether a connection WindowSize and a stream WindowSize managed by the HTTP control unit 307 are equal to or higher than a threshold value or not. If it is determined that the WindowSizes are equal to or higher than the threshold value, the UPDATE determining unit 308 determines not to transmit a WINDOW_UPDATE frame.

According to this exemplary embodiment, the threshold value is 1 byte, for example. In other words, the Size determining unit 311 determines whether the all of the WindowSize is consumed or not. The threshold value is not limited to 1 byte but may be equal to or lower than a maximum value ($2^{31}-1$) of the WindowSize with which transmission in a WINDOW_UPDATE frame can be performed. For example, the threshold value may be set to InitialWindowSize (which is an initial window size). In this case, the Size determining unit 311 determines whether the WindowSize is consumed from the initial state or not. For example, the threshold value may be set to a memory size usable by the communication apparatus 20 for data reception. In this case, the Size determining unit 311 determines whether the WindowSize reaches a higher limit relating to the resource of the communication apparatus 20. A case where the threshold value is 1 byte will be described below, for example.

According to this exemplary embodiment, if the HTTP control unit 307 receives a HEADERS frame, the UPDATE determining unit 308 uses the Length acquiring unit 312 and the Size determining unit 311 to determine whether a WINDOW_UPDATE frame is to be transmitted or not. The Length acquiring unit 312 obtains the value of a Content-Length set in the received HEADERS frame. The Size determining unit 311 whether a connection WindowSize and a stream WindowSize managed by the HTTP control unit 307 are equal to or higher than a Content-Length value or not. If it is determined that the WindowSizes are equal to or higher than the Content-Length value, the UPDATE determining unit 308 determines not to transmit a WINDOW_UPDATE frame.

(Communication Sequence)

A communication sequence between the communication apparatus 10 and the communication apparatus 20 according to this exemplary embodiment will be described in detail below. FIG. 8 is a sequence diagram for describing system operations in a case where the communication apparatus 20 determines transmission of a WINDOW_UPDATE frame based on the Content-Length and WindowSize according to this exemplary embodiment. Referring to FIG. 8, the processing starts at a time point when a user operation for performing communication with the communication apparatus 20 is input to the communication apparatus 10, for example. However, the time for starting processing in FIG. 8 is not limited to the time point. Like numbers refer to like parts in FIG. 4 and FIG. 8, and the repetitive description will be omitted.

The processing in M801 is the same as the processing in M401. In M802, the communication apparatus 10 transmits a HEADERS frame describing information that 32 KB payload data is to be transmitted by using a POST method in the stream 1 (ID_1) to the communication apparatus 20. According to this exemplary embodiment, the HEADERS frame includes a Content-Length field. A Content-Length value indicates the size of payload data to be transmitted subsequently to the HEADERS frame and is assumed as 32 KB here. In this case, the WindowSize relating to the connection (ID_0) of the communication apparatus 20 is equal to 64 KB, and the WindowSize relating to the stream 1 (ID_1) is equal to 64 KB.

In M803, the communication apparatus 10 transmits a 32 KB DATA frame to the communication apparatus 20 by using the stream 1 (ID_1). The DATA frame is the final DATA frame in the stream 1, and the END_STREAM flag is therefore enabled (with a value of 1). When the DATA frame is received by the communication apparatus 20, the WindowSize relating to the connection (ID_0) of the communication apparatus 20 is equal to 32 KB, and the WindowSize relating to the stream 1 (ID_1) is equal to 32 KB. In M804, the communication apparatus 20 executes reception processing on the DATA frame received in the M803.

In M805, the communication apparatus 20 determines whether a WINDOW_UPDATE frame is to be transmitted or not. The communication apparatus 20 determines that the DATA frame is the final DATA frame because the END_STREAM flag of the DATA frame received in M803 is enabled and that a DATA frame will not be received by using the stream 1 after this. Thus, the communication apparatus 20 controls so as to inhibit transmission of a WINDOW_UPDATE frame relating to the stream 1 (ID_1). Because the connection WindowSize is equal to or higher than a predetermined threshold value, the communication apparatus 20 controls so as to inhibit transmission of a connection WINDOW_UPDATE frame for increasing the connection WindowSize. According to this exemplary embodiment, the threshold value is 1 byte. In M806, the communication apparatus 20 transmits a HEADERS frame describing "200 OK" as HTTP response header information to the communication apparatus 10 by using the stream 1 (ID_1).

In M807, the communication apparatus 10 transmits a HEADERS frame describing information that 16 KB payload data is to be transmitted by using a POST method in the stream 3 (ID_3) to the communication apparatus 20. At that time, the WindowSize relating to the connection (ID_0) of the communication apparatus 20 is equal to 32 KB, and the WindowSize relating to the stream 3 (ID_3) is equal to 64 KB. In M808, the communication apparatus 10 transmits a 16 KB DATA frame to the communication apparatus 20 by using the stream 3 (ID_3). Because the DATA frame is the final DATA frame in the stream 3, the END_STREAM flag is enabled (with a value of 1). When the DATA frame is received by the communication apparatus 20, the WindowSize relating to the connection (ID_0) of the communication apparatus 20 is equal to 16 KB, and the WindowSize relating to the stream 3 (ID_3) is equal to 48 KB.

In M809, the communication apparatus 20 performs reception processing on the DATA frame received in M808. In M810, the communication apparatus 20 determines whether a WINDOW_UPDATE frame is to be transmitted or not. The communication apparatus 20 determines that the DATA frame is the final DATA frame because the END_STREAM flag of the DATA frame received in M808 is enabled and that a DATA frame will not be received by using the stream 3 after this. Accordingly, communication apparatus 20 controls so as to inhibit transmission of a WINDOW_UPDATE frame relating to the stream 3 (ID_3). Because the connection WindowSize is equal to or higher than the threshold value (1 byte), the communication apparatus 20 controls so as to inhibit transmission of a connection WINDOW_UPDATE frame for increasing the connection WindowSize.

In M811, the communication apparatus 20 transmits a HEADERS frame describing "200 OK" as HTTP response header information to the communication apparatus 10 by using the stream 3 (ID_3). In M812, the communication apparatus 10 transmits a HEADERS frame describing information that 32 KB payload data is to be transmitted by using a POST method in the stream 5 (ID_5) to the communication apparatus 20. At that time, the WindowSize relating to the connection (ID_0) of the communication apparatus 20 is equal to 16 KB, and the WindowSize relating to the stream 5 (ID_5) is equal to 64 KB.

In M813, the communication apparatus 20 determines whether a WINDOW_UPDATE frame is to be transmitted or not. The communication apparatus 20 controls so as to inhibit the notification in a case where the amount of data of a content transmitted by the other communication party is smaller than the amount of data that the communication apparatus 20 has permitted data transmission using the logical connection. According to this exemplary embodiment, the value of the Content-Length in the HEADERS frame received by the communication apparatus 20 in M812 is equal to 32 KB, and the WindowSize of the connection (ID_0) is larger than 16 KB. From this, the communication apparatus 20 determines that the connection WindowSize is required to be increased for receiving the whole payload data. The communication apparatus 20 controls so as to immediately transmit a WINDOW_UPDATE frame relating to the connection (ID_0). On the other hand, because 32 KB that is the value of the Content-Length is smaller than 64 KB that is the value of the WindowSize of the stream 5 (ID_5), the communication apparatus 20 determines that the stream WindowSize is sufficient. Accordingly, the communication apparatus 20 controls so as to inhibit transmission of a WINDOW_UPDATE frame relating to the stream 5 (ID_5).

In M814, the communication apparatus 20 transmits a WINDOW_UPDATE frame of 48 KB relating to the connection (ID_0) to the communication apparatus 10. Thus, the WindowSize relating to the connection (ID_0) of the communication apparatus 20 is equal to 64 KB so that the communication apparatus 10 can transmit the whole 32 KB payload data by performing one DATA-frame transmission. In M815, the communication apparatus 10 transmits a 32 KB DATA frame to the communication apparatus 20 by using the stream 5 (ID_5). Because the DATA frame is the final DATA frame in the stream 5, the END_STREAM flag is enabled (with a value of 1). When the DATA frame is received by the communication apparatus 20, the WindowSize relating to the connection (ID_0) of the communication apparatus 20 is equal to 32 KB, and the WindowSize relating to the stream 5 (ID_5) is equal to 32 KB. In M816, the communication apparatus 20 performs reception processing on the DATA frame received in M815.

In M817, the communication apparatus 20 determines whether a WINDOW_UPDATE frame is to be transmitted or not. The communication apparatus 20 determines that the DATA frame is the final DATA frame because the END_STREAM flag of the DATA frame received in M815 is enabled and that a DATA frame will not be received by using the stream 5 after this. Accordingly, the communication apparatus 20 controls so as to inhibit transmission of a WINDOW_UPDATE frame relating to the stream 5 (ID_5). Because the connection WindowSize is equal to or higher than the threshold value (1 byte), the communication apparatus 20 controls so as to inhibit transmission of a connection WINDOW_UPDATE frame for increasing the connection WindowSize. In M818, the communication apparatus 20 transmits a HEADERS frame describing "200 OK" as HTTP response header information to the communication apparatus 10 by using the stream 5 (ID_5). The processing in M819 and M820 is the same as that in M412 and M413.

Flow for Determining Transmission of WINDOW_UPDATE Frame

FIG. 9 is a flowchart describing operations relating to determination of transmission of a WINDOW_UPDATE frame to be performed by the communication apparatus 20 according to this exemplary embodiment. Referring to FIG. 9, the processing starts at a time point when the communication apparatus 20 receives some frame from the communication apparatus 10, for example. However, the time for starting processing in FIG. 9 is not limited to the time point. Like numbers refer to like parts in FIG. 7 and FIG. 9, and the repetitive description will be omitted.

In S901, the HTTP control unit 307 determines whether a DATA frame has been received from the communication apparatus 10 by using a stream in an HTTP communication or not. If a DATA frame has been received (S901, Yes), the processing moves to S902. If not (S901, No), the processing moves to S911. The processing in S902 to S904 is the same as the processing in S702 to S704. In S904, if the END_STREAM flag is enabled (S904, Yes), the processing moves to S907. If not (S904, No), the processing moves to S905.

In S905, the UPDATE determining unit 308 uses the Size determining unit 311 to determine whether the WindowSize relating to the stream used for receiving the DATA frame is equal to or higher than a predetermined threshold value or not. According to this exemplary embodiment, the threshold value is 1 byte. In other words, the Size determining unit 311 determines whether the stream WindowSize is larger than 0 bytes or not. If the stream WindowSize is equal to or larger than the threshold value (S905, Yes), the UPDATE determining unit 308 determines not to transmit a stream WINDOW_UPDATE frame. The processing then moves S907.

On the other hand, if the stream WindowSize is smaller than the threshold value (S905, No), the processing moves to S906.

The processing in S906 to S908 is the same as that in S705 to S707. In S907, if the HTTP control unit 307 does not receive or transmit a GOAWAY frame (S907, No), the processing moves to S909. If the HTTP control unit 307 receives or transmits a GOAWAY frame (S907, Yes), the processing moves to S908. In S908, if a stream in execution exists (S908, Yes), the processing moves to S909. If not (S908, No), the processing ends.

In S909, like S905, the UPDATE determining unit 308 uses the Size determining unit 311 to determine whether the connection WindowSize is equal to or larger than the threshold value (1 byte) (that is, whether it is larger than 0 bytes) or not. If the connection WindowSize is equal to or higher than the threshold value (S909, Yes), the UPDATE determining unit 308 determines not to transmit a connection WINDOW_UPDATE frame. The processing then ends. On the other hand, if the connection WindowSize is smaller than the threshold value (S909, No), the processing moves to S910. The processing in S910 is the same as that in S708.

In S911, the HTTP control unit 307 determines whether a HEADERS frame has been received from the communication apparatus 10 by using the stream in the HTTP communication or not. If a HEADERS frame has been received (S911, Yes), the processing moves to S912. If not (S911, No), the processing ends. In S912, the Length acquiring unit 312 determines whether a header block fragment of the HEADERS frame received by the HTTP control unit 307 includes a Content-Length field or not. If the Content-Length field is included (S912, Yes), the processing moves to S913. If not (S912, No), the processing ends. In S913, the Length acquiring unit 312 obtains the value of the Content-Length from the header block fragment in the HEADERS frame received by the HTTP control unit 307.

In S914, the UPDATE determining unit 308 determines whether the value of the Content-Length obtained in S913 is larger than the connection WindowSize or not. For the determination, the Size determining unit 311 and the Length acquiring unit 312 are used. If the value of the Content-Length is larger than the connection WindowSize (S914, Yes), the UPDATE determining unit 308 determines to transmit the connection WINDOW_UPDATE frame. The processing then moves to S915. On the other hand, if the value of the Content-Length is equal to or smaller than the connection WindowSize (S914, No), the UPDATE determining unit 308 determines not to transmit the connection WINDOW_UPDATE frame. The processing moves to S917.

In S915, the UPDATE determining unit 308 uses the Size determining unit 311 to determine an amount of increase of the connection WindowSize to be set in the WINDOW_UPDATE frame. The UPDATE determining unit 308 according to this exemplary embodiment determines an amount of increase such that the value acquired by subtracting the total size of the DATA frame stored in the reception buffer from the InitialWindowSize and the WindowSize can be equal. However, the UPDATE determining unit 308 may set such that the WindowSize can be larger than the Initial-WindowSize. In S916, the UPDATE determining unit 308 uses the HTTP control unit 307 to transmit the connection WINDOW_UPDATE frame to the communication apparatus 10.

In S917, the UPDATE determining unit 308 determines whether the stream WINDOW_UPDATE frame is to be transmitted or not. The UPDATE determining unit 308 controls so as to inhibit the notification in a case where the amount of data of a content transmitted by the other communication party is smaller than the amount of data that the communication apparatus 20 has permitted data transmission using the logical connection. According to this exemplary embodiment, the UPDATE determining unit 308 determines whether the value of the Content-Length obtained in S913 is larger than the WindowSize relating to the stream used for receiving the HEADERS frame or not. For this determination, the Size determining unit 311 and the Length acquiring unit 312 are used. If the value of the Content-Length is larger than the stream WindowSize (S917, Yes), the UPDATE determining unit 308 determines to transmit the stream WINDOW_UPDATE frame. The processing then moves to S918. On the other hand, if the value of the Content-Length is equal to or smaller than the connection WindowSize (S917, No), the UPDATE determining unit 308 determines not to transmit the connection WINDOW_UPDATE frame. The processing ends.

In S918, the UPDATE determining unit 308 uses the Size determining unit 311 to determine an amount of increase of the stream WindowSize to be set in the WINDOW_UPDATE frame. The method for determining the amount of increase is the same as that for the connection WindowSize in S915. In S919, the UPDATE determining unit 308 uses the HTTP control unit 307 to transmit the stream WINDOW_UPDATE frame to the communication apparatus 10. The processing then ends.

As described above, the communication apparatus 20 according to this exemplary embodiment does not transmit a connection WINDOW_UPDATE frame when the connection WindowSize is equal to or higher than the threshold value. The communication apparatus 20 does not transmit a stream WINDOW_UPDATE frame if the stream WindowSize is equal to or larger than the threshold value. Thus, the transmission of WINDOW_UPDATE frames from the communication apparatus 20 can be reduced, compared with a case where a WINDOW_UPDATE frame is transmitted every time a DATA frame is received. Therefore, the processing load can be reduced.

On the other hand, the communication apparatus 20 transmits a connection WINDOW_UPDATE frame if the connection WindowSize is smaller than the value of the Content-Length described in the HEADERS frame. The communication apparatus 20 transmits a WINDOW_UPDATE frame relating to the stream if the WindowSize relating to the stream used for receiving the HEADERS frame is smaller than the value of the Content-Length.

A case where the transmission is not performed, more specifically, where a WINDOW_UPDATE frame is not to be transmitted in M814 FIG. 8, for example, will be discussed below. In this case, because the connection WindowSize in the communication apparatus 20 is equal to 16 KB, the communication apparatus 10 first transmits a DATA frame including data of 16 KB of the whole 32 KB payload data. Because the connection WindowSize is equal to 0 KB and is therefore smaller than the threshold value, the communication apparatus 20 having received the DATA frame transmits a connection WINDOW_UPDATE frame to the communication apparatus 10. In response thereto, the communication apparatus 10 transmits a DATA frame including the remaining 16 KB data.

On the other hand, according to this exemplary embodiment, the communication apparatus 20 transmits a connection WINDOW_UPDATE frame to the communication apparatus 10 in M814 after the HEADERS frame is received and before the DATA frame is received, as described above. Thus, the communication apparatus 10 can transmit the whole 32 KB payload data in one DATA frame in M815 so that the delay in the transmission can be reduced compared with a case where two 16 KB DATA frames are transmitted. This can improve the transmission throughput of DATA frames from the communication apparatus 10 to the communication apparatus 20.

If the connection WindowSize is smaller than the value of the Content-Length but is equal to or larger than the InitialWindowSize, the communication apparatus 20 may not transmit a connection WINDOW_UPDATE frame. This may correspond to a case where the connection WindowSize is not consumed, for example, because the maximum value of the WindowSize is equal to the InitialWindowSize according to this exemplary embodiment. Therefore, transmission of the connection WINDOW_UPDATE frame is not necessary. Thus, the communication apparatus 20 can further reduce the unnecessary transmissions of WINDOW_UPDATE frames and can therefore reduce the processing load.

Having described mainly the example in which, according to this exemplary embodiment, the communication apparatus 20 determines whether a stream WINDOW_UPDATE frame is to be transmitted every time a HEADERS frame or a DATA frame is received, aspects of the present invention are not limited thereto. In a case where the amount of data of a content to be transmitted by the other communication party is smaller than the amount of data that the communication apparatus 20 has permitted transmission of data using a logical connection, the communication apparatus 20 may control to inhibit notification relating to the permitted amount of data until the logical connection is disconnected. More specifically, for example, the communication apparatus 20 may determine whether the value of the Content-Length described in a received HEADERS frame is smaller than the WindowSize relating to the stream used for the reception or not. If the value of the Content-Length is equal to or smaller than the stream WindowSize, the communication apparatus 20 can receive the whole payload data transmitted subsequently to the HEADERS frame without transmitting a stream WINDOW_UPDATE frame. Thus, the UPDATE determining unit 308 may control so as to inhibit transmission of a stream WINDOW_UPDATE frame until the stream is disconnected. This can eliminate necessity of determination of transmission of a WINDOW_UPDATE every performed by the communication apparatus 20 every time a DATA frame is received, which can further reduce the processing load.

The communication apparatus 20 determines whether a WINDOW_UPDATE frame is to be transmitted or not based on the amount of data which have not been received. If the amount of data which have not been received of the data included in a content received from the communication apparatus 10 by using a logical connection is smaller than a predetermined value, the communication apparatus 20 controls so as to inhibit the notification until the logical connection is disconnected. More specifically, the HTTP control unit 307 manages the amount of data which have not been received yet of payload data to be transmitted by using a stream from the communication apparatus 10. This is acquired by subtracting the size of a received DATA frame from the value of the Content-Length. If the amount of data which have not been received is smaller than the predetermined value, the UPDATE determining unit 308 controls to inhibit transmission of a stream WINDOW_UPDATE frame until the stream is disconnected. The predetermined value may be equal to the stream WindowSize or may be 1 byte, for example. Thus, the communication apparatus 20 may detect that the transmission of a WINDOW_UPDATE frame is not necessary in the communication with the communication apparatus 10 and reduces the transmissions of the WINDOW_UPDATE frame from then, which can reduce the processing load.

A case where the predetermined value is equal to the stream WindowSize will be discussed, for example. If the amount of data which have not been received is smaller than the stream WindowSize in transmission and reception of WINDOW_UPDATE frames and DATA frames, the communication apparatus 20 controls to inhibit transmission of a stream WINDOW_UPDATE frame from then. In this case, if the value of the Content-Length is smaller than the stream WindowSize, the communication apparatus 20 controls so as to inhibit transmission of stream WINDOW_UPDATE frames after a HEADERS frame is received. In a case where the predetermined value is equal to 1 byte, for example, the communication apparatus 20 controls so as to inhibit transmission of a WINDOW_UPDATE frame after the final data frame is received.

Third Exemplary Embodiment

A third exemplary embodiment according to the present invention will be described.

According to the third exemplary embodiment, the communication apparatus 10 being a client apparatus performs the processing as described with reference to FIG. 9 while the communication apparatus 20 being a server apparatus transmits a WINDOW_UPDATE frame to perform flow control. The repetitive descriptions on common parts with respect to the communication system configuration, the functional module configurations, the sequences, and flowcharts between the first or second exemplary embodiment and the third exemplary embodiment will be omitted.

(Communication Sequence)

A communication sequence between the communication apparatus 10 and the communication apparatus 20 according to this exemplary embodiment will be described below in detail. FIG. 10 is a sequence diagram for describing system operations to be performed in a case where the communication apparatus 10 determines the amount of data to be notified with a WINDOW_UPDATE frame based on a Content-Length according to this exemplary embodiment. Referring to FIG. 10, the processing starts at a time point when a user operation for performing communication with the communication apparatus 20 is input to the communication apparatus 10, for example. However, the time for starting processing in FIG. 10 is not limited to the time point. Like numbers refer to like parts in FIG. 4 or 8 and FIG. 10, and the repetitive description will be omitted.

The processing in M1001 is the same as that in M401. In M1002, the communication apparatus 10 transmits a HEADERS frame describing information that data designated with URL_1 is requested by using a GET method in the stream 1 (ID_1) to the communication apparatus 20. In M1003, the communication apparatus 20 transmits a HEADERS frame describing information that 100 KB payload data designated with URL_1 is to be transmitted in response to a request in the stream 1 (ID_1) to the communication apparatus 10. According to this exemplary embodiment, the HEADERS frame contains "200 OK" as a status code. The HEADERS frame further contains a Content-Length field having 100 KB being a payload data size as a value of the Content-Length. In this case, the WindowSize relating to the connection (ID_0) of the communication apparatus 10 is equal to 64 KB, and the WindowSize relating to the stream 1 (ID_1) is equal to 64 KB.

In M1004, the communication apparatus 10 determines whether a WINDOW_UPDATE frame is to be transmitted or not. The value of the Content-Length in the HEADERS frame received by the communication apparatus 10 in M1003 is equal to 100 KB that is larger than 64 KB being the WindowSize of the connection (ID_0). From this, the communication apparatus 10 determines that the Window-Size is required to be increased for receiving the whole payload data. Accordingly, the communication apparatus 10 determines an amount of increase of the connection WindowSize as 36 KB such that the connection WindowSize can be equal to the value (100 KB) of the Content-Length larger than the default value (64 KB). The communication apparatus 10 designates the amount of increase (36 KB) of the connection WindowSize and controls so as to immediately transmit a WINDOW_UPDATE frame relating to the connection (ID_0). In the same manner, the communication apparatus 10 designates the amount of increase (36 KB) of the stream WindowSize and controls so as to immediately transmit a WINDOW_UPDATE frame relating to the stream 1 (ID_1).

In M1005, the communication apparatus 10 transmits a WINDOW_UPDATE frame of 36 KB relating to the connection (ID_0) to the communication apparatus 20. When the WINDOW_UPDATE frame is transmitted, the WindowSize relating to the connection (ID_0) of the communication apparatus 10 is equal to 100 KB while the WindowSize relating to the stream 1 (ID_1) is still equal to 64 KB. In M1006, the communication apparatus 10 transmits a WINDOW_UPDATE frame of 36 KB relating to the stream 1 (ID_1) to the communication apparatus 20. When the WINDOW_UPDATE frame is transmitted, the WindowSize relating to the stream 1 (ID_1) is equal to 100 KB.

In M1007, the communication apparatus 20 transmits a 100 KB DATA frame to the communication apparatus 10 by using the stream 1 (ID_1). Because the DATA frame is the final DATA frame in the stream 1, the END_STREAM flag is enabled (with a value of 1). When the DATA frame is received by the communication apparatus 10, the WindowSize relating to the connection (ID_0) of the communication apparatus 10 is equal to 0 KB, and the WindowSize relating to the stream 1 (ID_1) is equal to 0 KB. In M1008, the communication apparatus 10 performs reception processing on the DATA frame received in M1007.

In M1009, the communication apparatus 10 determines whether a WINDOW_UPDATE frame is to be transmitted or not. Because the END_STREAM flag of the DATA frame received in M1007 is enabled, the communication apparatus 10 determines that the DATA frame is the final DATA frame and a DATA frame will not be received by using the stream 1 from then. Therefore, the communication apparatus 10 controls so as to inhibit transmission of a WINDOW_UPDATE frame relating to the stream 1 (ID_1). On the other hand, because the connection WindowSize is smaller than the threshold value, the communication apparatus 10 controls so as to transmit a connection WINDOW_UPDATE frame. At that time, the communication apparatus 10 sets the amount of increase of the connection WindowSize to be set in the WINDOW_UPDATE frame to 64 KB such that the connection WindowSize can return to the default value (64 KB). However, the method for setting the amount of increase of the WindowSize is not limited thereto. For example, the WindowSize may be larger than the default value as in M1004.

In M1010, the communication apparatus 10 transmits a WINDOW_UPDATE frame of 64 KB relating to the connection (ID_0) to the communication apparatus 20. When the WINDOW_UPDATE frame is transmitted, the WindowSize relating to the connection (ID_0) of the communication apparatus 10 is equal to 64 KB.

In M1011, the communication apparatus 10 transmits a HEADERS frame describing information that data designated with URL_3 is to be requested by using a GET method in the stream 3 (ID_3) to the communication apparatus 20. In M1012, the communication apparatus 20 transmits a HEADERS frame describing information that 32 KB payload data designated with URL_3 is to be transmitted in response to a request in the stream 3 (ID_3) to the communication apparatus 10. At that time, the WindowSize relating to the connection (ID_0) of the communication apparatus 10 is equal to 64 KB, the WindowSize relating to the stream 3 (ID_3) is equal to 64 KB.

In M1013, the communication apparatus 20 transmits a 32 KB DATA frame to the communication apparatus 10 by using the stream 3 (ID_3). Because the DATA frame is the final DATA frame in the stream 3, the END_STREAM flag is enabled (with a value of 1). When the DATA frame is received by the communication apparatus 10, the WindowSize relating to the connection (ID_0) of the communication apparatus 10 is equal to 32 KB, and the WindowSize relating to the stream 3 (ID_3) is equal to 32 KB.

In M1014, the communication apparatus 10 performs reception processing on the DATA frame received in M1013. In M1015, the communication apparatus 10 determines whether a WINDOW_UPDATE frame is to be transmitted or not. The communication apparatus 10 determines that the DATA frame received in M1013 is the final DATA frame and that a DATA frame will not be used by using the stream 3 from then. Accordingly, the communication apparatus 10 controls so as to inhibit transmission of a WINDOW_UPDATE frame relating to the stream 3 (ID_3). Because the connection WindowSize is equal to or larger than the threshold value, the communication apparatus 10 controls so as to inhibit transmission of a connection WINDOW_UPDATE frame. The processing in M1016 and M1017 is the same as the processing in M412 and M413. The successful reception of the DATA frame by the communication apparatus 10 in M1013 is notified to the communication apparatus 20 by a confirmation response transmitted by the TCP control unit 306 in the transport layer.

As described above, the communication apparatus 10 according to this exemplary embodiment as an HTTP client determines whether a WINDOW_UPDATE frame is to be transmitted or not. On the other hand, according to the first exemplary embodiment and second exemplary embodiment, the communication apparatus 20 as an HTTP server determines whether a WINDOW_UPDATE frame is to be transmitted or not. As described above, also in either case where a communication apparatus operates as a client apparatus or a server apparatus, the number of transmissions of a WINDOW_UPDATE frame can be reduced, which can suppress an increase of the processing load.

The communication apparatus 10 according to this exemplary embodiment sets the amount of increase of the connection WindowSize such that the value of the connection WindowSize can be larger than the InitialWindowSize for a connection. This is executed in a case where the value of the Content-Length is larger than 64 KB that is a default value of the InitialWindowSize for connection. In this case, the communication apparatus 10 determines the amount of increase of the connection WindowSize such that the value of the connection WindowSize and the value of the Content-Length can be equal. Thus, the communication apparatus 20 can transmit payload data of a size larger than the default value of the connection WindowSize in one DATA frame. Therefore, the delay of the transmission can be reduced compared with a case where the communication apparatus 20 transmits a plurality of DATA frames each being smaller than the InitialWindowSize, which can improve the throughput of DATA frame transmission from the communication apparatus 20 to the communication apparatus 10.

A case will be discussed in which the value of the Content-Length is more than twice as much as the InitialWindowSize. In this case, when the maximum value of the WindowSize is set to the InitialWindowSize, the communication apparatus 10 transmits a connection WINDOW_UPDATE frame a plurality of number of times until whole payload data are received. According to this exemplary embodiment on the other hand, the communication apparatus 10 can receive whole payload data by transmitting a connection WINDOW_UPDATE frame once with the WindowSize equal to the value of the Content-Length. Thus, the communication apparatus 10 can reduce the number of transmissions of a WINDOW_UPDATE frame, which can reduce the processing load.

According to this exemplary embodiment, the communication apparatus 10 controls such that the connection WindowSize and the amount of data of content represented by the Content-Length can be equal. However, aspects of the present invention are not limited thereto. For example, the communication apparatus 10 may control such that the connection WindowSize can be equal to or larger than the amount of data of a content. The connection WindowSize larger than the amount of data of a content under control of the communication apparatus 10 can increase the possibility that the transmission of a WINDOW_UPDATE frame is not necessary when a HEADERS frame is received next.

In a case where a sufficient memory region is not available for the value of the Content-Length as a reception buffer, the communication apparatus 10 may control such that the connection WindowSize can be smaller than the value of the Content-Length. Thus, the communication apparatus 10 can control the WindowSize properly in consideration of the resource constraint of the apparatus, which can both achieve resource saving and processing load reduction. The method for determining the amount of increase of the stream WindowSize is also applicable for the connection WindowSize.

This exemplary embodiment can suppress the increase of the processing load on a communication apparatus associated with the processing for notifying the amount of data permitting transmission by the communication apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102822, filed May 20, 2015, which is hereby incorporated by reference herein in its entirety.

The invention claimed is:

1. A communication apparatus comprising:
one or more hardware processors; and
one or more memories which store instructions executable by the one or more hardware processors to cause the communication apparatus to perform at least:
obtaining information indicating a data amount of a content to be transmitted from a transmitting apparatus over a logical connection between the communication apparatus and the transmitting apparatus;
receiving data included in the content that is transmitted from the transmitting apparatus, wherein an amount of data transmitted from the transmitting apparatus does not exceed a window size representing a permissible data amount of which data transmission over the logical connection is permitted;
determining whether an amount of remaining data of the content yet to be received is smaller than a predetermined amount, based on the obtained information;
controlling, according to the determining that the amount of the remaining data of the content yet to be received is not smaller than the predetermined amount, the communication apparatus to transmit a notification for updating the window size to the transmitting apparatus in response to the receiving of data included in the content; and
controlling, according to the determining that the amount of the remaining data of the content yet to be received is smaller than the predetermined amount, the communication apparatus not to transmit the notification for updating the window size to the transmitting apparatus while the logical connection is maintained even if data included in the content is received.

2. The communication apparatus according to claim 1, wherein it is determined that the amount of the remaining data is smaller than the predetermined amount in a case where information indicating last data of the content to be transmitted over the logical connection from the transmitting apparatus to the communication apparatus is included in the received data of the content.

3. The communication apparatus according to claim 1, wherein it is determined that the amount of the remaining data is smaller than the predetermined amount in a case where the window size is not less than the data amount of the content.

4. The communication apparatus according to claim 3, wherein the communication apparatus transmit the notification such that the window size becomes equal to or larger than the data amount of the content indicated by the obtained information in a case where the window size is less than the data amount of the content.

5. The communication apparatus according to claim 1, wherein
the data of the content is transmitted from the transmitting apparatus over a second logical connection established based on a first logical connection between the transmitting apparatus and the communication apparatus, and
a first notification for updating a first window size representing a permissible data amount of which data transmission over the second logical connection is permitted and a second notification for updating a second window size representing a total permissible data amount of which data transmissions over one or more second logical connections based on the first logical connection are transmitted from the communication apparatus.

6. The communication apparatus according to claim 1, wherein the window size is defined as a space of a reception buffer of the communication apparatus corresponding to the logical connection.

7. The communication apparatus according to claim 1, wherein a WINDOW_UPDATE frame provided in HTTP/2 is transmitted as the notification.

8. The communication apparatus according to claim 1, wherein the logical connection is a stream provided in HTTP/2.

9. The communication apparatus according to claim 5, wherein the first logical connection is a connection provided in HTTP/2, and the second logical connection is a stream provided in HTTP/2.

10. The communication apparatus according to claim 2, wherein the information indicating last data of the content to be transmitted over the logical connection from the transmitting apparatus to the communication apparatus is an END_STREAM flag provided in HTTP/2.

11. The communication apparatus according to claim 1, wherein the information indicating the data amount of the content is obtained from a frame with a Content-Length field provided in HTTP/2.

12. The communication apparatus according to claim 1, wherein the predetermined amount is 1 byte or the window size.

13. A communication method performed by a communication apparatus, the method comprising:
obtaining information indicating a data amount of a content to be transmitted from a transmitting apparatus over a logical connection between the communication apparatus and the transmitting apparatus;
receiving data included in the content that is transmitted from the transmitting apparatus, wherein an amount of data transmitted from the transmitting apparatus does not exceed a window size representing a permissible data amount of which data transmission over the logical connection is permitted;
determining whether an amount of remaining data of the content yet to be received is smaller than a predetermined amount, based on the obtained information;
controlling, according to the determining that the amount of the remaining data of the content yet to be received is not smaller than the predetermined amount, the communication apparatus to transmit a notification for updating the window size to the transmitting apparatus in response to the receiving of data included in the content; and
controlling, according to the determining that the amount of the remaining data of the content yet to be received is smaller than the predetermined amount, the communication apparatus not to transmit the notification for updating the window size while the logical connection is maintained even if data included in the content is received.

14. The communication method according to claim 13, wherein it is determined that the amount of the remaining data is smaller than the predetermined amount in a case where information indicating last data of the content to be transmitted over the logical connection from the transmitting apparatus to the communication apparatus is included in the transmitted data of the content.

15. The communication method according to claim 13, wherein
it is determined that the amount of the remaining data is smaller than the predetermined amount in a case where the data amount of the content is smaller than the window size.

16. A non-transitory computer-readable storage medium storing a program executable by a computer functioning as a communication apparatus, the program causing the communication apparatus to perform at least:
obtaining information indicating a data amount of a content to be transmitted from a transmitting apparatus over a logical connection between the communication apparatus and the transmitting apparatus;
receiving data included in the content that is transmitted from the transmitting apparatus, wherein an amount of data transmitted from the transmitting apparatus does not exceed a window size representing a permissible data amount of which data transmission over the logical connection is permitted;
determining whether an amount of remaining data of the content yet to be received is smaller than a predetermined amount, based on the obtained information;
controlling, according to the determining that the amount of the remaining data of the content yet to be received is not smaller than the predetermined amount, the communication apparatus to transmit a notification for updating the window size to the transmitting apparatus in response to the receiving of data included in the content; and
controlling, according to the determining that the amount of the remaining data of the content yet to be received is smaller than the predetermined amount, the communication apparatus not to transmit the notification for updating the window size to the transmitting apparatus while the logical connection is maintained even if data included in the content is received.

\* \* \* \* \*